United States Patent
Zhang et al.

(10) Patent No.: US 8,856,257 B1
(45) Date of Patent: Oct. 7, 2014

(54) SENDING ALERTS FROM CLOUD COMPUTING SYSTEMS

(75) Inventors: Lianlai Zhang, Vienna, VA (US); Lida He, Sleepy Hallow, NY (US); Cheuk Lam, Yorktown Heights, NY (US); Brent W. Anderson, Conroe, TX (US); Alik Saring, Karnataka (IN)

(73) Assignee: EMC Corporation, Hopkinton, MA (US)

( * ) Notice: Subject to any disclaimer, the term of this patent is extended or adjusted under 35 U.S.C. 154(b) by 278 days.

(21) Appl. No.: 13/537,889

(22) Filed: Jun. 29, 2012

(51) Int. Cl.
*G06F 15/16* (2006.01)

(52) U.S. Cl.
USPC ........................................ 709/207

(58) Field of Classification Search
USPC ........................................ 709/207
See application file for complete search history.

(56) References Cited

U.S. PATENT DOCUMENTS

| | | | |
|---|---|---|---|
| 5,742,792 A | 4/1998 | Yanai et al. |
| 6,434,637 B1 | 8/2002 | D'Errico |
| 6,622,221 B1 | 9/2003 | Zahavi |
| 6,965,845 B2 | 11/2005 | Ohsie et al. |
| 7,003,433 B2 | 2/2006 | Yemini et al. |
| 7,054,883 B2 | 5/2006 | Meiri et al. |
| 7,266,706 B2 | 9/2007 | Brown et al. |
| 7,292,969 B1 | 11/2007 | Aharoni et al. |
| 7,392,360 B1 | 6/2008 | Aharoni et al. |
| 7,441,023 B2 | 10/2008 | Benjamin et al. |
| 7,475,207 B2 | 1/2009 | Bromling et al. |
| 7,529,181 B2 | 5/2009 | Yardeni et al. |
| 7,577,722 B1 | 8/2009 | Khandekar et al. |
| 7,613,890 B1 | 11/2009 | Meiri |
| 7,688,753 B1 | 3/2010 | Zimran et al. |
| 7,714,733 B2 * | 5/2010 | Farley et al. ................... 340/628 |
| 7,720,003 B2 | 5/2010 | Benjamin et al. |
| 7,779,291 B2 | 8/2010 | Yoder et al. |
| 7,783,778 B2 | 8/2010 | Benjamin |
| 7,949,637 B1 | 5/2011 | Burke |
| 8,028,062 B1 | 9/2011 | Wigmore et al. |
| 2006/0031450 A1 | 2/2006 | Unrau et al. |
| 2012/0005542 A1 * | 1/2012 | Petersen et al. ................... 714/48 |

OTHER PUBLICATIONS

U.S. Appl. No. 12/932,080, filed Feb. 17, 2011, Meiri et al.
U.S. Appl. No. 13/065,806, filed Mar. 30, 2011, Smirnov et al.
U.S. Appl. No. 13/136,359, filed Jul. 29, 2011, Van Der Goot.
U.S. Appl. No. 13/335,316, filed Dec. 22, 2011, Lim et al.
U.S. Appl. No. 13/435,183, filed Mar. 30, 2012, Saring et al.
U.S. Appl. No. 13/433,885, filed Mar. 29, 2012, Salamon et al.
RFC 1215, "A Convention for Defining Traps for use with the SNMP," Network Working Group, ed. M. Rose, Mar. 1991, 9 pp.
RFC 5424, "The Syslog Protocol," Network Working Group, R. Gerhards, Mar. 2009, 39 pp.

(Continued)

*Primary Examiner* — Yves Dalencourt
(74) *Attorney, Agent, or Firm* — Muirhead and Saturnelli, LLC

(57) ABSTRACT

A system is described for sending alert messages collected for cloud computing system to external systems. The alert messages may be sent according to determined protocols, such as the syslog protocol and/or SNMP trap, among other appropriate protocols. Partitioning and/or fragmenting of the alert message may be provided based on the use of various types of message identifications and/or other information in which, by virtue of the partitioning and fragmenting, an alert message, regardless of its length, may be sent and reconstructed at the external system. The system advantageously provides for transmission of alert messages using mechanisms other than the syslog protocol and with additional included alert attribute information.

20 Claims, 15 Drawing Sheets

(56) References Cited

OTHER PUBLICATIONS

EMC Corporation, "EMC Ionix ControlCenter (formerly EMC ControlCenter) 6.0 StorageScope: Best Practices Planning," White Paper H4154, Jun. 2009, 43 pp.

VCE Company, "Simplifying Incident and Problem Management with Vblock™ Infrastructure Platforms," White Paper, Feb. 2011, 18 pp.

VCE Company, "Automated Monitoring and Event Recovery of Vblock™ Infrastructure Platforms with IPSoft Managed Service," White Paper, May 2011, 20 pp.

EMC Corporation, "EMC Ionix Unified Infrastructure Manager/Operations: Centralized visibility into VCE Vblock Infrastructure Platforms and Their Availability," Data Sheet H8713.2, Nov. 2011, 2 pp.

EMC Corporation, "EMC Unified Infrastructure Manager/Operations: Centralized visibility across multiple VCE Vblock Infrastructure Platforms and Their Availability," Data Sheet H8713.3, Apr. 2012, 2 pp.

* cited by examiner

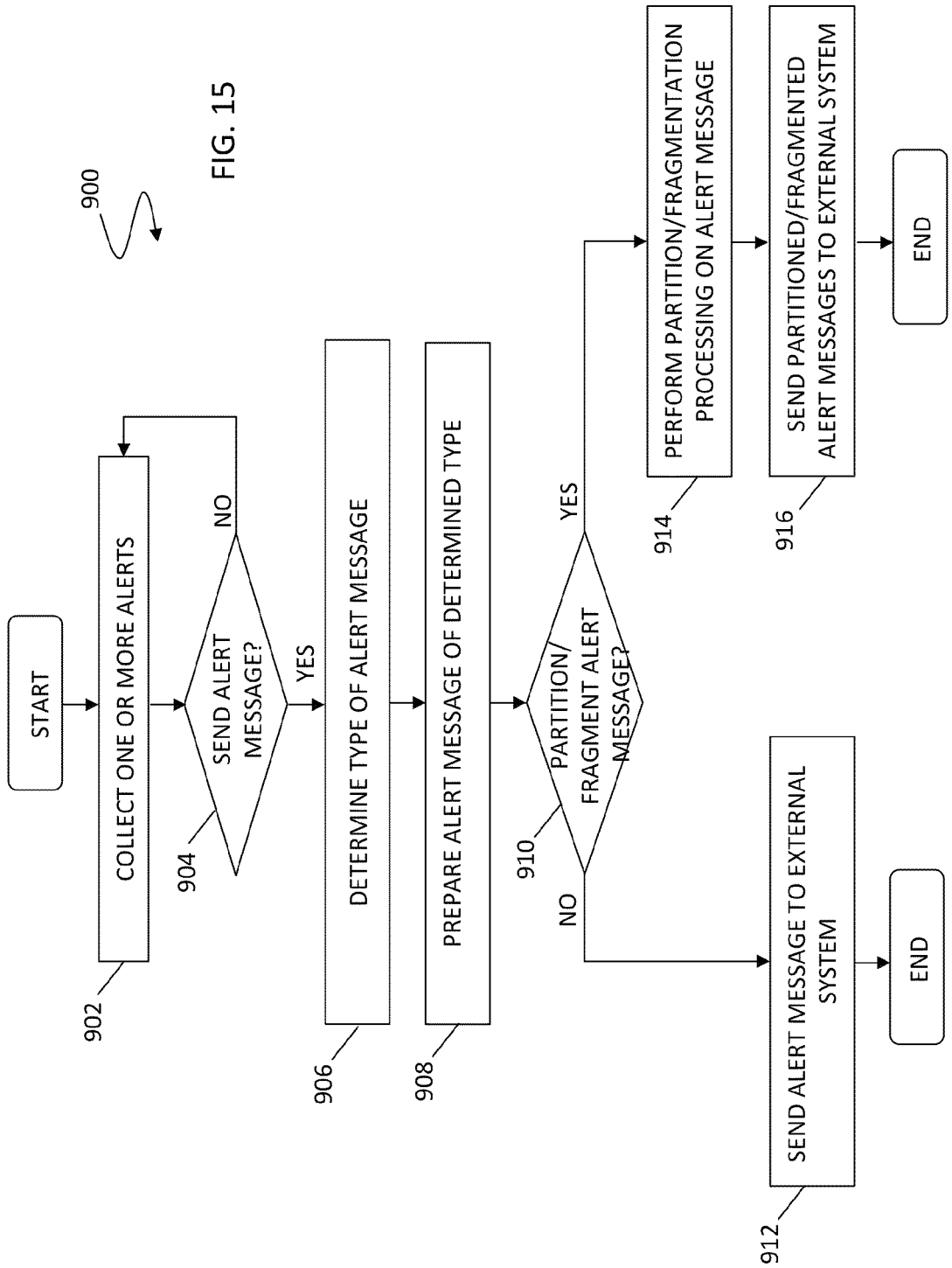

SENDING ALERTS FROM CLOUD COMPUTING SYSTEMS

TECHNICAL FIELD

This application relates to management of a distributed system and, more particularly, to the managing and transmission of cloud computing system alert messages.

BACKGROUND OF THE INVENTION

Host processor systems may store and retrieve data using storage devices (also referred to as storage arrays) containing a plurality of host interface units (host adapters), disk drives, and disk interface units (disk adapters). Such storage devices are provided, for example, by EMC Corporation of Hopkinton, Mass. The host systems access the storage device through a plurality of channels provided therewith. Host systems provide data and access control information through the channels of the storage device and the storage device provides data to the host systems also through the channels. The host systems do not address the disk drives of the storage device directly, but rather, access what appears to the host systems as a plurality of logical volumes. Different sections of the logical volumes may or may not correspond to the actual disk drives. The hosts, storage devices and/or other elements, such as switches and/or array components, may be provided as part of a storage area network (SAN).

Performance characteristics of the storage devices and/or other elements of the SAN may be monitored according to different performance statistics and measures. Performance characteristics may include, for example, performance data, capacity data, and/or discovery data, including configuration data and/or topology data, among other characteristics. As an example, performance characteristics of input/output (I/O) data paths among storage devices and components may be measured and may include I/O operations (e.g., measured in I/Os per second and Mbs per second) initiated by a host that will result in corresponding activity in SAN fabric links, storage array ports and adapters, and storage volumes. Other characteristics may similarly be measured. Such characteristics may be significant factors in managing storage system performance, for example, in analyzing use of lowering access performance versus more expensive higher performance disk drives in a SAN, or by expanding number of SAN channels or channel capacity. Users may balance performance, capacity and costs when considering how and whether to replace and/or modify one or more storage devices or components.

Root cause and impact analysis of events occurring in a system may provide automated processes for correlating the events with their root causes. Reference is made, for example, to: U.S. Pat. No. 7,529,181 to Yardeni et al., entitled "Method and Apparatus for Adaptive Monitoring and Management of Distributed Systems," that discloses a system for providing adaptive monitoring of detected events in a distributed system; U.S. Pat. No. 7,003,433 to Yemini et al., entitled "Apparatus and Method for Event Correlation and Problem Reporting," that discloses a system for determining the source of a problem in a complex system of managed components based upon symptoms; and U.S. Pat. No. 6,965,845 to Ohsie et al., entitled "Method and Apparatus for System Management Using Codebook Correlation with Symptom Exclusion," that discloses a system for correlating events in a system and provides a mapping between each of a plurality of groups of possible symptoms and one of a plurality of likely problems in the system, all of which are assigned to EMC Corporation and are incorporated herein by reference.

Under various circumstances, it is desirable to send alerts concerning events, causes and impacts collected for cloud computing system components to external systems, e.g., remote systems. Known techniques provide for the use of the syslog protocol to send alert messages to external systems. Use of the syslog protocol, however, may result in various disadvantages and/or inefficiencies in the transmission of alert messages, including, for example, considerations of permitted syslog message size. Accordingly, it would be desirable to transmit cloud computing system alert messages to external systems using mechanisms in addition to or other than the syslog protocol and/or with enhancements to the use of the syslog protocol for alert transmissions.

SUMMARY OF THE INVENTION

According to the system described herein, a method for sending an alert message from a cloud computing system to an external system includes collecting at least one alert for the could computing system. A time for sending the at least one alert as an alert message to the external system is determined. A transmission type of the alert message is determined. The alert message is prepared according to the transmission type. It is determined whether the alert message is transmissible in unaltered form according to the determined transmission type. After determining that the alert message is not transmissible in unaltered form according to the determined transmission type, message form processing is performed on the alert message to yield a plurality of processed form messages. The message form processing includes partitioning the alert message into a plurality of partitioned messages, and fragmenting at least one of the plurality of partitioned messages into a plurality of fragmented messages. The plurality of processed form messages are then sent to the external system. The transmission type may include at least one of: syslog protocol or simple network management protocol (SNMP) trap. The time for sending the at least one alert may be determined according to at least one of: (i) based on content of the alert message, (ii) manually set by a user, (iii) automatically at periodic intervals, or (iv) in real time after the at least one alert is processed. The alert message may include alert data that includes at least one alert attribute. Each of the plurality of fragmented messages may include a portion of the alert data. Each of the plurality of partitioned messages and each of the plurality of fragmented messages may include information that permits reconstructing of the alert message. The cloud computing system may include at least one Vblock, and the at least one alert may include a Vblock alert. Determining whether the alert message is transmissible in unaltered form according to the determined transmission type may include determining that the alert message is not transmissible in unaltered from based on a size of the alert message exceeding a permitted size according to the determined transmission type.

According further to the system described herein, a non-transitory computer readable medium stores software for sending an alert message from a cloud computing system to an external system. The software includes executable code that collects at least one alert for the cloud computing system. Executable code is provided that determines a time for sending the at least one alert as an alert message to the external system. Executable code is provided that determines a transmission type of the alert message. Executable code is provided that prepares the alert message according to the transmission type. Executable code is provided that determines whether the alert message is transmissible in unaltered form according to the determined transmission type. Executable code is provided that, after determining that the alert message is not transmissible in unaltered form according to the determined transmission type, performs message form processing on the alert message to yield a plurality of processed form messages. The message form processing may include partitioning the alert message into a plurality of partitioned messages, and fragmenting at least one of the plurality of partitioned messages into a plurality of fragmented messages. Executable code is provided that sends the plurality of processed form messages to the external system. The transmission type may include at least one of: syslog protocol or simple network management protocol (SNMP) trap. The time for sending the at least one alert may be determined according to at least one of: (i) based on content of the alert message, (ii) manually set by a user, (iii) automatically at periodic intervals, or (iv) in real time after the at least one alert is processed. The alert message may include alert data that includes at least one alert attribute. Each of the plurality of fragmented messages may include a portion of the alert data. Each of the plurality of partitioned messages and each of the plurality of fragmented messages may include information that permits reconstructing of the alert message. The cloud computing system may include at least one Vblock, and the at least one alert may include a Vblock alert. Determining whether the alert message is transmissible in unaltered form according to the determined transmission type may include determining that the alert message is not transmissible in unaltered from based on a size of the alert message exceeding a permitted size according to the determined transmission type.

According further to the system described herein, a cloud computing system that sends an alert message to an external system includes at least one cloud processing component, wherein the cloud processing component is at least one of: a compute component, a network component or a storage component. A manager component is included that includes at least one processor and a non-transitory computer readable medium storing software executable by the at least one processor. The software includes executable code that collects at least one alert for the cloud computing system. Executable code is provided that determines a time for sending the at least one alert as an alert message to the external system. Executable code is provided that determines a transmission type of the alert message. Executable code is provided that prepares the alert message according to the transmission type. Executable code is provided that determines whether the alert message is transmissible in unaltered form according to the determined transmission type. Executable code is provided that, after determining that the alert message is not transmissible in unaltered form according to the determined transmission type, performs message form processing on the alert message to yield a plurality of processed form messages. The message form processing may include partitioning the alert message into a plurality of partitioned messages, and fragmenting at least one of the plurality of partitioned messages into a plurality of fragmented messages. Executable code is provided that sends the plurality of processed form messages to the external system. The transmission type includes at least one of: syslog protocol or simple network management protocol (SNMP) trap. The at least one cloud processing component may include a Vblock, and the at least one alert may include a Vblock alert. The alert message may include alert data that includes at least one alert attribute, and in which each of the plurality of fragmented messages may include a portion of the alert data.

BRIEF DESCRIPTION OF THE DRAWINGS

Embodiments of the system are described with reference to the several figures of the drawings, which are briefly described as follows.

FIG. 15 is a flow diagram showing processing for sending an alert message according to an embodiment of the system described herein.

DETAILED DESCRIPTION OF VARIOUS EMBODIMENTS

Figure 1:
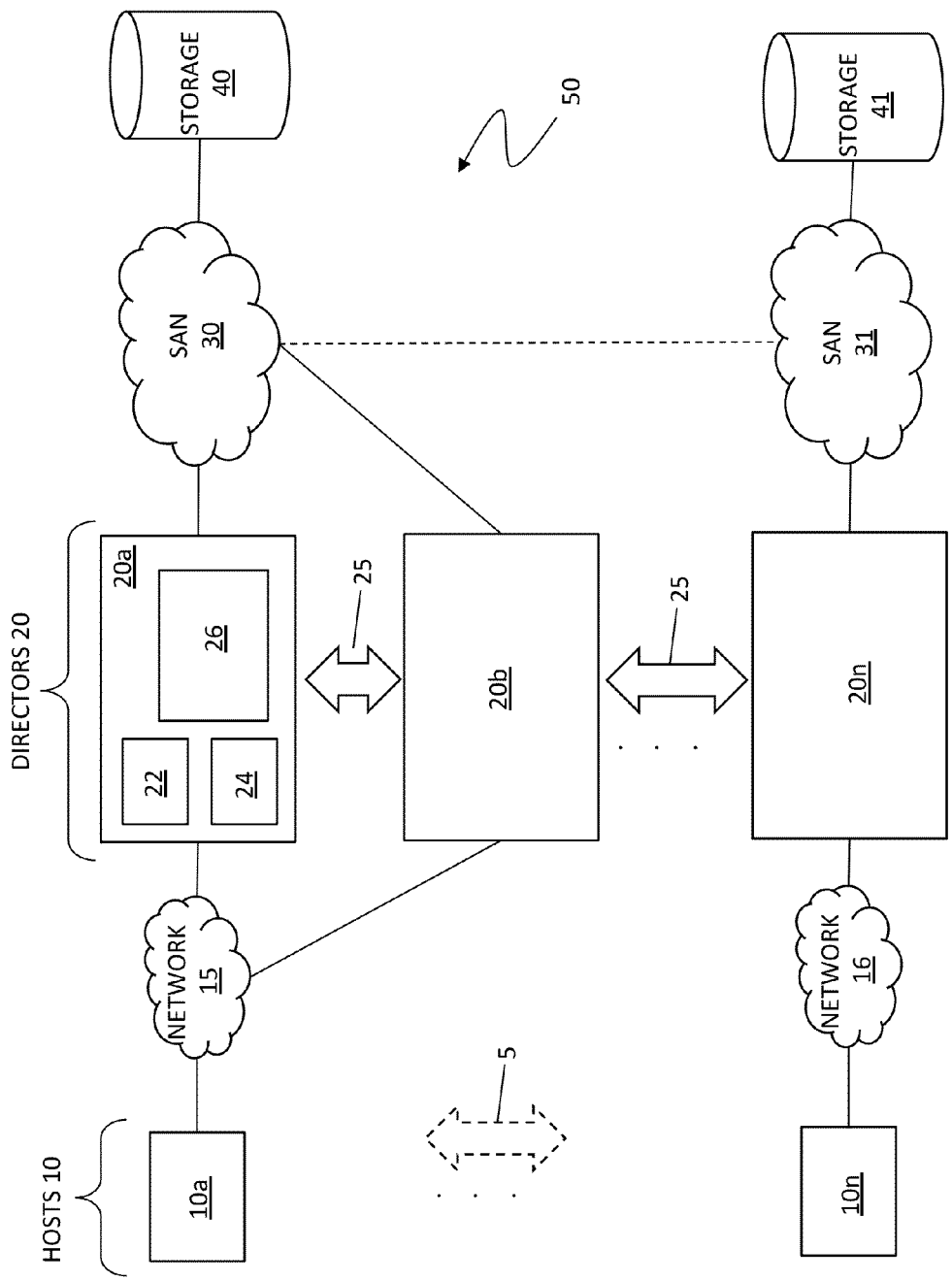
FIG. 1 shows a network configuration of a distributed storage system that may be used in accordance with an embodiment of the system described herein.

FIG. 1 shows a network configuration of a distributed storage system 50 that may be used in accordance with an embodiment of the system described herein. As shown, a plurality of host devices 10 (10*a* to 10*n*) are communicably coupled with a plurality of directors 20 (20*a*, 20*b* to 20*n*). Each of the directors 20 may include a processor (CPU) component 22, such as a microprocessor or other intelligence module, a cache component 24 (e.g., RAM cache), an instance of a distributed cache manager 26 and/or other local storage and communication ports. (In general, "n" is used herein to indicate an indefinite plurality, so that the number "n" when referred to one component does not necessarily equal the number "n" of a different component. For example, the number of hosts 10 may or may not equal the number of directors 20 in FIG. 1.) Cache memory may be considered memory that is faster and more easily accessible by a processor than other non-cache memory used by a device.

Each of the hosts 10 may be communicably coupled to one or more of directors 20 over one or more network connections 15, 16. It is noted that host devices 10 may be operatively coupled with directors 20 over any of a number of connection schemes as required for the specific application and geographical location relative to each of the directors 20, including, for example, a direct wired or wireless connection, an Internet connection, a local area network (LAN) type connection, a wide area network (WAN) type connection, a VLAN, a proprietary network connection, a Fibre channel (FC) network etc. Furthermore, hosts may also be coupled to one another via the networks 15, 16 and/or operationally via a different network 5 and several of the hosts 10 may be clustered together at one or more sites in which the sites are geographically distant from one another.

Each of the directors 20 may also include, or be communicably coupled with, one or more file systems, such as a virtual machine file system (VMFS), a new technology file system (NTFS) and/or other appropriate file system, and may be communicably coupled with one or multiple storage resources 40, 41, each including one or more disk drives and/or other storage volumes, over one or more storage area networks (SAN) 30, 31, and/or other appropriate network, such as a LAN, WAN, etc.

The directors 20 may be located in close physical proximity to each other, and/or one or more may be remotely located, e.g., geographically remote, from other directors, as further discussed elsewhere herein. It is possible for the SANs 30, 31 to be coupled together, and/or for embodiments of the system described herein to operate on the same SAN, as illustrated by a dashed line between the SAN 30 and the SAN 31. Each of the directors 20 may also be able to intercommunicate with other directors over a network 25, such as a public or private network, a peripheral component interconnected (PCI) bus, a Fibre Channel (FC) network, an Ethernet network and/or an InfiniBand network, among other appropriate networks. In other embodiments, the directors may also be able to communicate over the SANs 30, 31 and/or over the networks 15, 16, and it is noted that the networks 15, 16 may be combined with, and/or incorporated with, one or more of the SANs 30, 31. Generally, a SAN may be used to couple one or directors and/or host devices with one or more storage devices in a manner that allows reconfiguring connections without having to physically disconnect and reconnect cables from and to ports of the devices. A SAN may be implemented using one or more switches to which the storage devices, directors and/or host devices are coupled. The switches may be programmed to allow connections between specific ports of devices coupled to the switches. A port that can initiate a data-path connection may be called an "initiator" port while the other port may be deemed a "target" port.

Several of the directors 20 may be clustered together at one or more sites and in which the sites are geographically distant from one another. The system described herein may be used in connection with a vSphere produced by VMware Inc. of Palo Alto, Calif. and/or a VPLEX product produced EMC Corporation of Hopkinton, Mass., respectively. The system described herein may also be used in connection with a storage array product produced by EMC Corporation, such as a Symmetrix product, and/or with a Vblock platform product produced by VCE Company, LLC. Although generally discussed and illustrated in connection with embodiment for a distributed storage system, the system described herein may generally be used in connection with any appropriate distributed processing or cloud computing system, as further discussed elsewhere herein.

Each distributed cache manager 26 may be responsible for providing coherence mechanisms for shared data across a distributed set of directors. In general, the distributed cache manager 26 may include a module with software executing on a processor or other intelligence module (e.g., ASIC) in a director. The distributed cache manager 26 may be implemented in a single director or distributed across multiple intercommunicating directors. In certain aspects, each of the directors 20 may be embodied as a controller device, or blade, communicably coupled to one or more of the SANs 30, 31 that allows access to data stored on the storage networks. However, it may be appreciated that a director may also be embodied as an intelligent fabric switch, a hub adapter and/or other appropriate network device and may also be implemented as a virtual machine, as further discussed elsewhere herein. Because Locality Conscious Directory Migration (LCDM) is applicable to databases, any suitable networked director may be configured to operate as an access node with distributed cache manager functionality. For example, a distributed cache manager may be run on one or more desktop computers and/or virtual machines with a network connection.

A distributed storage system may enable a storage device to be exported from multiple distributed directors, which may be either appliances or arrays, for example. In an active/active storage system, if there are multiple interfaces to a storage device, each of the interfaces may provide equal access to the storage device. With an active/active storage system, hosts in different locations may have simultaneous write access to mirrored exported storage device(s) through a local front-end thereof (i.e., a director). The distributed storage system may be responsible for providing globally consistent and coherent data access. The system described herein may be used in connection with enabling the distributed storage system to meet consistency guarantees and maximize data access even in response to failures that may cause inconsistent data within the distributed storage system.

Using virtualization software, one or more physical servers may be subdivided into a plurality of virtual machines. As further discussed elsewhere herein, a virtual machine (VM) is a software implementation of a machine that executes programs like a physical machine. Virtualization software allows multiple VMs with separate operating systems to run in isolation on the same physical server. Each VM may have its own set of virtual hardware (e.g., RAM, CPU, NIC, etc.) upon which an operating system and applications are loaded. The operating system may see a consistent, normalized set of hardware regardless of the actual physical hardware components. The term "virtualization software" is used herein to generally refer to any and all software that supports the operation of one or more VMs. A number of virtualization software products exist, including the VMware product family provided by VMware, Inc. of Palo Alto, Calif. A benefit of providing VMs is the ability to host multiple, unrelated, clients in a single physical server. The virtualization software may maintain separation of each of the clients, and in which each of the clients separately access their own virtual server(s). Other virtualization products that may be used in connection with the system described herein include Hyper-V by Microsoft Corporation of Redmond, Wash., public license virtualization products and/or other appropriate virtualization software.

Configuring and deploying VMs is known in the field of computer science. For example, U.S. Pat. No. 7,577,722 to Khandekar, et al., entitled "Provisioning of Computer Systems Using Virtual Machines," which is incorporated herein by reference, discloses techniques for configuring and deploying a VM according to user specifications. VMs may be provisioned with respect to any appropriate resource, including, for example, storage resources, CPU processing resources and/or memory. Operations of VMs may include using virtual machine images. A VM image is the state of the virtual machine as it resides in the host's memory. The VM image may be obtained for an operating VM and transferred to another location where the VM continues execution from the state defined by the virtual machine image. In this way, the VM image may be a snapshot of an execution state of a program by a VM that may be moved between different locations and processing thereafter continued without interruption.

As discussed in detail elsewhere herein, in a virtualized environment, a virtual center, an example of which may be a vCenter product produced by VMware, Inc. of Palo Alto, Calif., may provide a central point of control for managing, monitoring, provisioning and migrating virtual machines. Data storage and management may be provided in connection with one or more data centers coupled by a network. Virtual centers may operate to control virtual machines in the data centers and, for example, in connection with cloud computing. A virtual center may further include a virtual data center (VDC) that provides logical control and management of data storage in a data center. A virtual center may be used in connection with an infrastructure platform that provides an integrated package of components to provide network, compute and/or storage services for use in a virtualized environment. One example of an infrastructure platform is a Vblock product produced by VCE Company, LLC. It is noted that where the term "Vblock" is used herein, it may also be generally understood as including and referring to any other appropriate software and/or component packages that provide network, compute and/or storage services for use in a virtualized computing environment. Management of a Vblock may be provided by an appropriate software element. For example, EMC's Ionix Unified Infrastructure Manager (UIM) may be integrated with Vblock and provide a management console for management of the Vblock package in accordance with operations and functionality further discussed in detail elsewhere herein.

Figure 2:
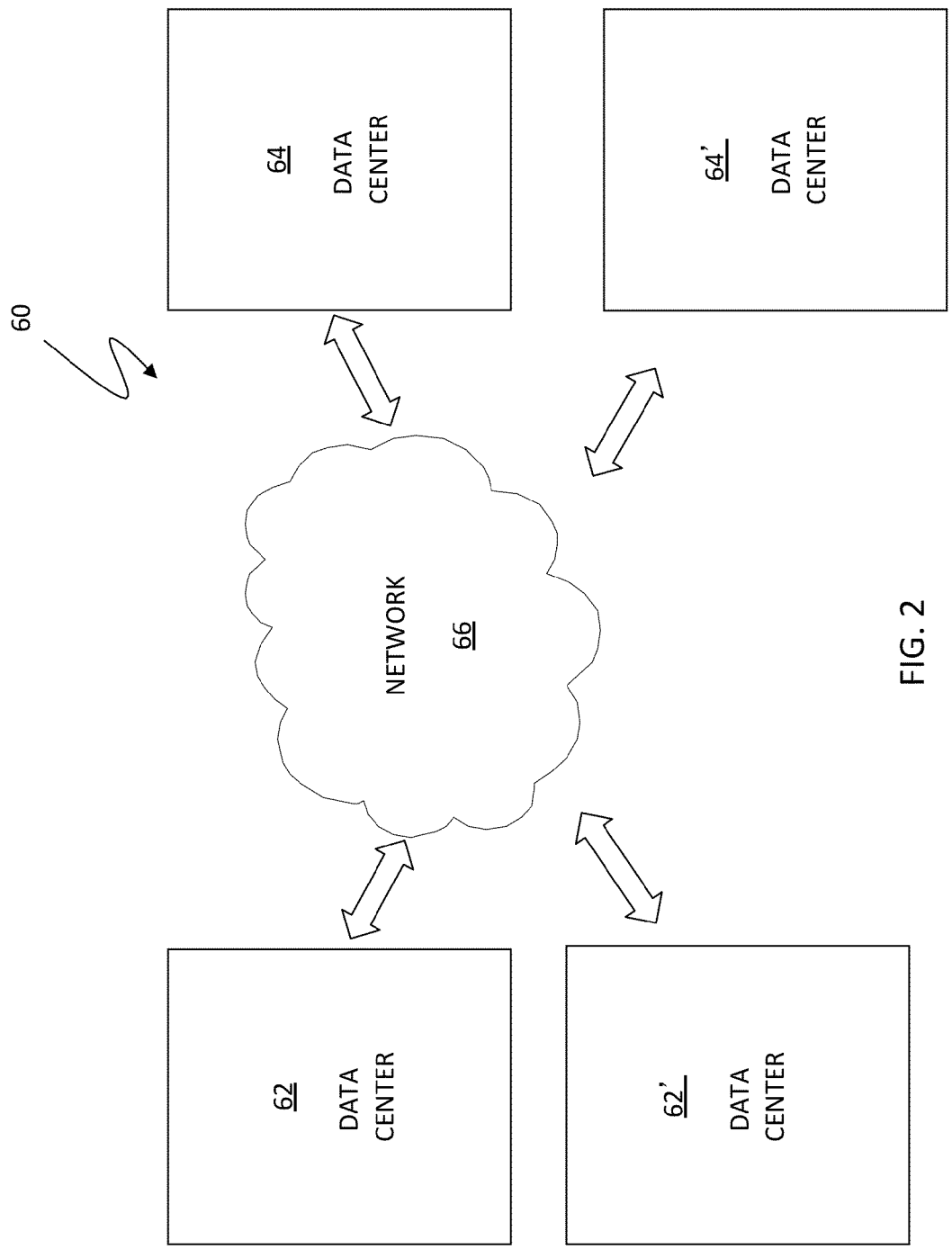
FIG. 2 is a schematic illustration showing a system that includes a plurality of data centers in communication via a network that may be used in accordance with an embodiment of the system described herein.

FIG. 2 is a schematic illustration showing a system 60 that includes a first data center 62 in communication with a second data center 64 via a network 66. Although embodiments are discussed principally in connection with two data centers 62, 64, any number of additional data centers, represented as data centers 62', 64', may be also be used in connection with the system described herein. Each of the data centers 62, 64 may include a plurality of devices and processors (see, e.g., FIG. 1) for executing applications using a plurality of VMs and which may be controlled and/or managed in connection with one or more virtual centers and/or VDCs. The VMs may be configured using any appropriate server virtualization technology, such as that provided by VMware, Inc. of Palo Alto, Calif., including vSphere. VSphere is a suite of tools/applications offering the ability to perform cloud computing utilizing enterprise-level virtualization products such as VMware's ESX and/or ESXi. VSphere allows multiple VMs to run on any ESX host. Other VM technology may be used including any appropriate VM technology provided by other vendors.

The data centers 62, 64 may contain any number of processors and storage devices that are configured to provide the functionality described herein. The data centers 62, 64 may be configured similarly to each other or may be configured differently. The network 66 may be any network or similar mechanism allowing data communication between the data centers 62, 64. In an embodiment herein, the network 66 may be the Internet and/or any other appropriate network and each of the data centers 62, 64 may be coupled thereto using any appropriate mechanism. In other embodiments, the network 66 may represent a direct connection (e.g., a physical connection) between the data centers 62, 64.

In various embodiments, VMs may be migrated from a source one of the data centers 62, 64 to a destination one of the data centers 62, 64. VMs may be transferred from one data site to another, including VM mobility over geographical distances, for example, for reasons of disaster avoidance, load balancing and testing, among other reasons. For a discussion of migrating VMs, reference is made to U.S. patent application Ser. No. 12/932,080 to Meiri et al., filed Feb. 17, 2011, entitled "VM Mobility Over Distance," and U.S. patent application Ser. No. 13/136,359 to Van Der Goot, filed Jul. 29, 2011, entitled "Active/Active Storage and Virtual Machine Mobility Over Asynchronous Distances," which are incorporated herein by reference and are assigned to the assignee of the present application. A product, such as EMC's VPLEX Metro and/or VPLEX Geo, may be used to manage VMs and other storage resources. VPLEX allows for logical storage units (e.g., logical unit numbers (LUNs)), provisioned from various storage arrays, to be managed through a centralized management interface. Products like VPLEX Metro or Geo provide for data mobility, availability and collaboration through active/active data over synchronous and asynchronous distances with provide for the ability to non-disruptively move many VMs. It is noted that where the term "VPLEX" is used herein it may also generally be understood as including and referring any other appropriate software and/or component packages that provide for coordinating and/or federating resources of disparate systems as a single pool of virtual resources, in particular, for example, a single pool of virtual storage.

Figure 3:
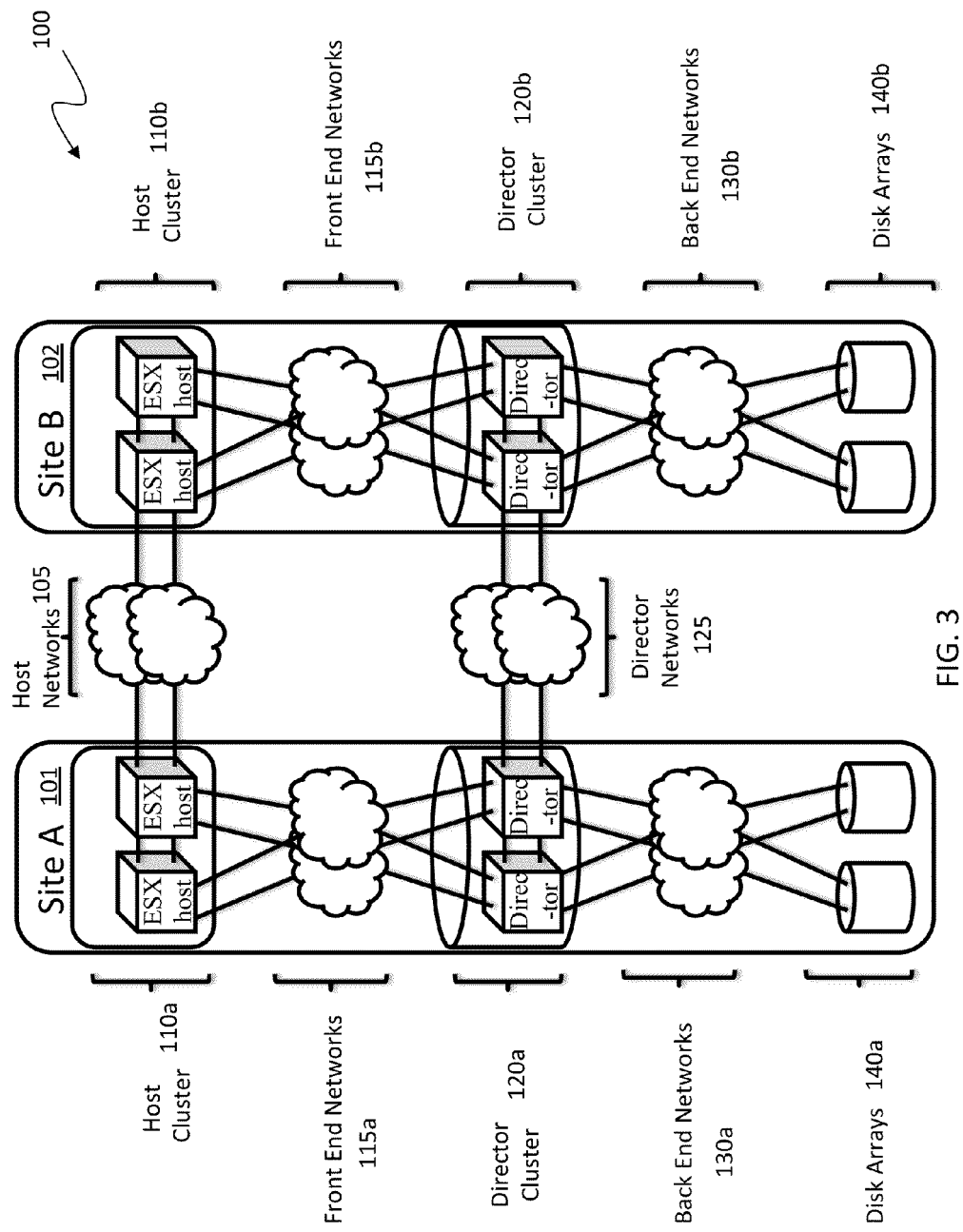
FIG. 3 is a schematic illustration showing a distributed storage system with multiple sites according to an embodiment of the system described herein.

FIG. 3 is a schematic illustration showing a distributed storage system 100 having multiple sites that may be used in connection with an embodiment of the system described herein. Although illustrated with two sites, Site A 101 and Site B 102, the system described herein may also operate in connection with additional sites. It is noted that components that are specifically discussed herein with respect to Site A 101 may be also be provided in Site B 102 (or any additional site), and vice versa where appropriate. The sites 101, 102 may include one or more hosts grouped in host clusters 110a,b, one or more directors grouped in director clusters 120a,b, and disk arrays 140a,b. Each host cluster 110a,b and director cluster 120a,b may each include software and/or other controllers or interfaces to control or administer operations in connection with described functions of the hosts and directors. In connection therewith, the components discussed herein in connection with the sites 101, 102 may, in various embodiments, be part of one or more data centers as further discussed elsewhere herein.

In an embodiment, each host cluster 110a,b may include ESX hosts in a vSphere cluster and director cluster 120a,b may include directors in a VPLEX cluster. Front end networks 115a,b may connect through host links to the host clusters 110a,b and through front end links to the director clusters 120a,b. One or more back end networks 230a,b may connect through back end links to the director clusters 120a,b and through array links to the disk arrays 140a,b. In an embodiment, the front and back end networks may be Fibre Channel networks. The front end networks 115a,b allow the hosts (or VMs running therein) to perform I/O operations with the host clusters 110a,b, while the back end networks 130a,b allow the directors of the director clusters 120a,b to perform I/O on the disk arrays 140a,b. One or more host networks 105, such as vSphere Ethernet networks, connect the ESX hosts in host clusters 110a,b. One or more director networks 125 connect the directors of the director clusters 120a,b.

Various types of failures, including network failures within a cluster, may result in behaviors that are further discussed elsewhere herein. It should be noted that the host cluster 110a,b (e.g., vSphere cluster) may be connected in such a way that VMs can keep their network (e.g., IP, FC, IB) addresses when migrating between clusters (for example, by means of a vLan or an open vSwitch). In an embodiment, VPLEX may be used and configured to expose one or more distributed volumes from both VPLEX director clusters. A virtual machine file system (VMFS) may be created on top of these distributed volumes allowing VMs that migrate between the sites to see the same file system in either site. It is also noted that, as illustrated and according to various embodiments, each site 101, 102 may include redundancies in hosts, directors and links therebetween.

In some embodiments, the system described herein may be used in connection with a first set of one or more data centers that are relatively active (primary data centers) and a second set of one or more data centers that are relatively inactive (failover data centers). The first set of data centers and second set of data centers may both be used for application reading and writing, but the first set of data centers may be more active and/or include more response time sensitive applications than the second set of data centers. Each of the relatively active data centers in the first set of data centers may use at least one corresponding data center in the second set of data centers for failover operations. It should also be noted that in addition to the active/active system described herein, the system described herein may also be used in active/passive functioning as appropriate or desired.

I/O access may be provided to distributed volumes in an active/active system with two sites separated by an asynchronous distance. For asynchronous operation, a write operation to cluster at a remote site may be acknowledged as soon as a protection copy is made within the cluster. Sometime later the write data is synchronized to the remote site. Similarly, writes to the remote site are later synchronized to a cluster at the local site. Software or other controllers at the director clusters, such as VPLEX, may present the same image of the data on either cluster to provide a cache-coherent view of the data. In an embodiment, this may be achieved by fetching data that has not yet been replicated between a source and destination site (i.e. "dirty" data; as compared with "clean" data which has been copied and is protected on multiple sites) over the inter-cluster link on an as needed basis. In the background, the controller (VPLEX) may synchronize the oldest dirty data between the clusters.

The above operations may work as long as the inter-cluster network is available. If the inter-cluster link fails, both clusters may contain dirty data that is unknown by the respective remote clusters. As a consequence of this failure, the director cluster may rollback the image of the data to a write order consistent point. In other words, the director cluster may rollback the image of the data to a point where it knows the data that is available on both clusters, or to a time where the write data was exchanged between both sites. The director cluster may also guarantee rollback to an image of the disk or volume that is write order consistent, which means that if the data of a specific write is available on the volume, all data of writes that were acknowledged before ("preceded") that write should be present too. Write order consistency is a feature that allows databases to recover by inspecting the volume image. As noted elsewhere herein, known techniques may provide write order consistency by grouping writes in what are called deltas and providing the consistency on a delta boundary basis (see, e.g. U.S. Pat. No. 7,475,207 to Bromling et al.).

Suspend/resume migration processing may involve suspending a VM in the source site and resuming that VM in the destination site. Before the suspended VM is resumed, all dirty data for the affected VMFS may be synchronized from the source VPLEX cluster to the destination VPLEX cluster, and the preference (i.e. "winner" site) for the distributed volume may be changed from the source cluster to the destination cluster. The preference attribute may be related to a VPLEX consistency group that contains one or more VMs. Hence, the VM may be in a consistency group of its own or all VMs in a consistency group may be migrated together. To know when the synchronization of VPLEX's dirty cache is finished, the customer may map the VMFS to a distributed volume.

Failures may also occur when a VM is migrated while performing I/O operations. In an example, the migration of a VM during I/O operations may be referred to herein as "vMotion" and may be facilitated by a VMware product called vMotion. In a director network failure situation during VM migration, both the source cluster directors and the destination cluster directors may contain dirty data. A similar problem may occur when multiple VMs have to be migrated together because they all access one VMFS volume. In an embodiment, this problem could be alleviated by suspending the restart of the VM on the destination cluster until the director cluster (e.g., VPLEX cluster) cache has been synchronized; however, such operation may cause undesirable delays. For further detailed discussion of specific system behaviors in connection with different types of failure scenarios, reference is made to U.S. patent application Ser. No. 13/136,359 to Van Der Goot, as cited elsewhere herein.

Figure 4:
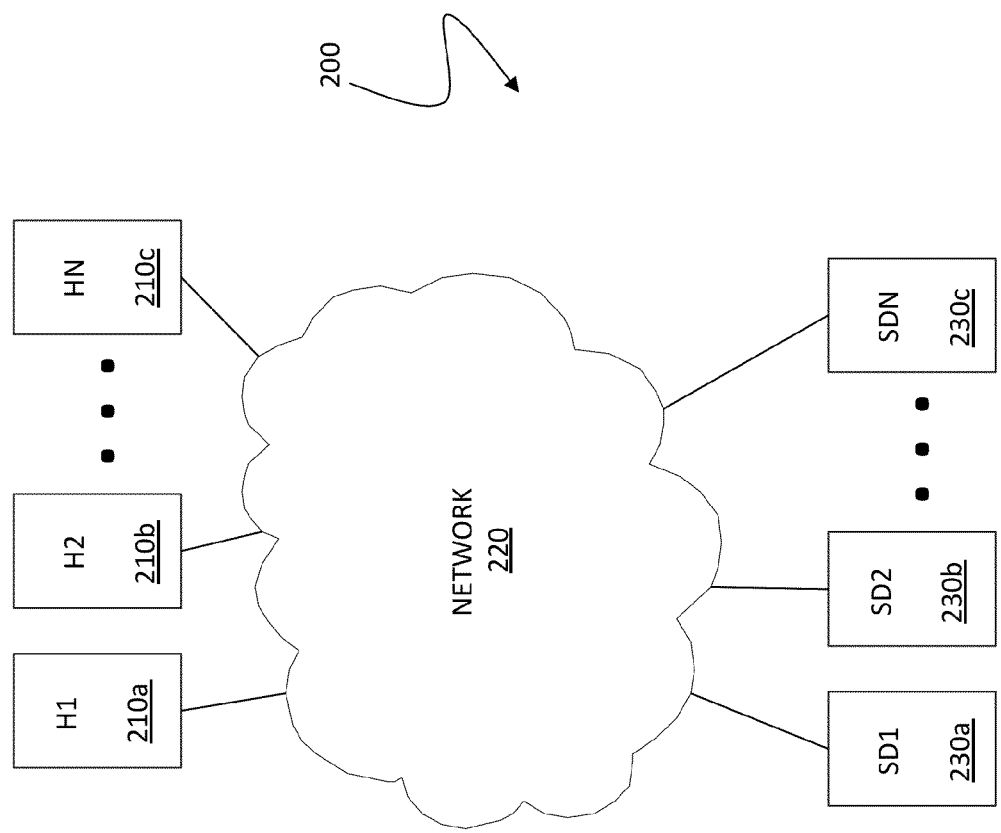
FIG. 4 is a schematic illustration showing a plurality of hosts coupled to a plurality of storage devices via a network according to an embodiment of the system described herein.

FIG. 4 is a schematic illustration 200 showing a network 220 that may include one or more of the networks, e.g. SANs, and provide a fabric coupling a plurality of host devices (H1-HN) 210a-c to a plurality of storage devices (SD1-SDN) 230a-c, as further discussed elsewhere herein. Each of the devices 210a-c, 230a-c may have a corresponding port that is physically coupled to switches of the SAN fabric used to implement the storage area network 220. The switches may be separately programmed by one of the devices 210a-c, 230a-c or by a different device (not shown). Programming the switches may include setting up specific zones that describe allowable data-path connections (which ports may form a data-path connection) and possible allowable initiator ports of those configurations. For example, there may be a zone for connecting the port of the host 210a with the port of the storage device 230a. Upon becoming activated (e.g., powering up), the host 210a and the storage device 230a may send appropriate signals to the switch(es) of the storage area network 220, and each other, which then allows the host 210a to initiate a data-path connection between the port of the host 210a and the port of the storage device 230a. Zones may be defined in terms of a unique identifier associated with each of the ports, such as such as a 64-bit world-wide port name (WWPN).

In various embodiments, the system described herein may be used in connection with performance data collection for data migration and/or data mirroring techniques using a SAN. Data transfer among storage devices, including transfers for data migration and/or mirroring functions, may involve various data synchronization processing and techniques to provide reliable protection copies of data among a source site and a destination site. In synchronous transfers, data may be transmitted to a remote site and an acknowledgement of a successful write is transmitted synchronously with the completion thereof. In asynchronous transfers, a data transfer process may be initiated and a data write may be acknowledged before the data is actually transferred to directors at the remote site. Asynchronous transfers may occur in connection with sites located geographically distant from each other. Asynchronous distances may be distances in which asynchronous transfers are used because synchronous transfers would take more time than is preferable or desired. Examples of data migration and mirroring products includes Remote Data Facility (RDF) products from EMC Corporation. For further discussion of RDF and the use thereof in data recovery and storage techniques, see, for example, U.S. Pat. No. 5,742,792 to Yanai, et al., entitled "Remote Data Mirroring" and U.S. Pat. No. 7,779,291 to Yoder et al., entitled "Four Site Triangular Asynchronous Replication," which are incorporated herein by reference.

Techniques involving the configuration and use of storage area networks, including virtual storage area networks, are described, for example, in U.S. Pat. No. 8,028,062 to Wigmore et al., entitled "Non-Disruptive Data Mobility Using Virtual Storage Area Networks With Split Path Virtualization," which is assigned to EMC Corporation and is incorporated herein by reference, that discloses techniques for the creation of a SAN centric storage virtualization layer that allows data mobility and migration without disruption to one or more hosts servers attached to the SAN. Reference is also made to U.S. Pat. No. 7,441,023 to Benjamin et al., entitled "Method and Apparatus for Modeling and Analyzing MPLS and Virtual Private Networks;" U.S. Pat. No. 7,720,003 to Benjamin et al., entitled "Model-Based Method and Apparatus for Determining MPLS Network Properties;" and U.S. Pat. No. 7,783,778 to Benjamin, entitled "Model-Based Method and Apparatus for Determining Virtual Private Network Topologies," which are assigned to EMC Corporation and are all incorporated herein by reference, that disclose various techniques for discovering and identifying network properties and topologies in a network represented by a model.

Figure 5:
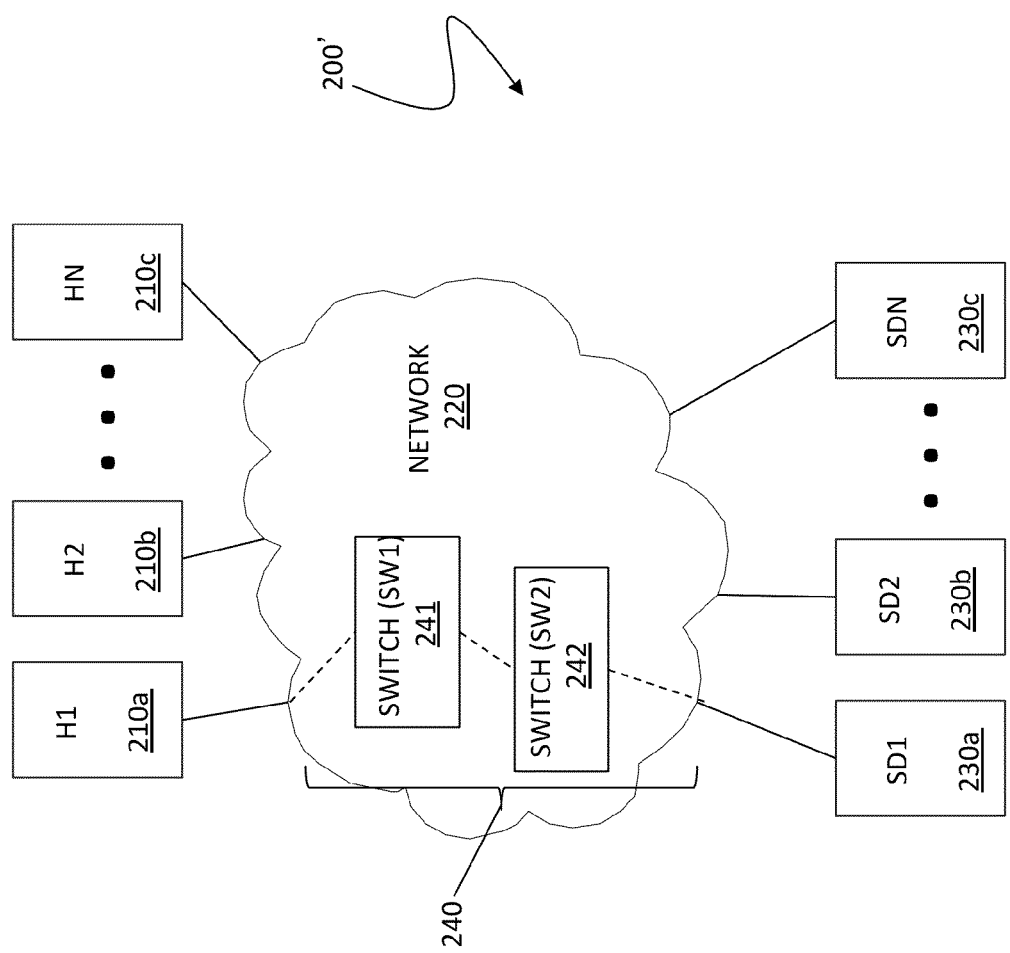
FIG. 5 is a schematic illustration of an embodiment of the network shown in FIG. 4 including multiple switches providing an I/O path between a host and a storage device in connection with an embodiment of the system described herein.

FIG. 5 is a schematic illustration 200' showing multiple SAN switches of a network 220, like that of FIG. 4, that may be used in connection with an embodiment of the system described herein. In the illustrated embodiment, the network 220 is shown with two switches, switch 241 (SW1) and switch 242 (SW2), that are used in connection with an I/O data path 240 from the host 210a to the storage device 230a. In various embodiments, the switches 241, 242 may include physical and/or logical devices. Although two switches are shown, more than two switches and/or other appropriate elements of a network fabric, including other types network elements and/or one or more compute elements, may be used in connection with the providing of I/O data paths from one or more of the hosts 210a-c to one or more of the storages devices 230a-c in connection with path performance data collection according to the system described herein.

The selection and/or identification of the I/O path 240 may be performed according to multiple selection factors and using known path selection techniques. Reference is made, for example, to U.S. Pat. No. 7,688,753 to Zimran et al., entitled "Selection of a Data Path Based on One or More Performance Characteristics of a Computer System," which is assigned to EMC Corporation and is incorporated herein by reference and which discloses techniques for data path selection based on performance characteristics of a computer system using a path selection module. Reference is also made to U.S. Pat. No. 6,434,637 to D'Errico, entitled "Method and Apparatus for Balancing Workloads Among Paths in a Multi-Path Computer System Based on the State of Previous I/O Operations," which is assigned to EMC corporation and is incorporated herein by reference and which discloses techniques for selecting one of at least two I/O data paths for transmission of the next I/O operation based upon a state of previously assigned I/O operations queued for transmission over the I/O paths.

It is further noted that the system described herein may be used in connection with simulation of data storage systems for evaluation purposes. For example, I/O data paths of simulated storage system configurations may be evaluated to determine preferred configurations and/or identify potential problems of a possible I/O data path and elements thereof. Suitable data storage system simulation tools that may be used in connection with the system described herein may include systems and methods like that disclosed in U.S. Pat. No. 7,392,360 to Aharoni et al., entitled "Method and System for Capacity Planning and Configuring One or More Data Storage Systems," U.S. Pat. No. 7,292,969 to Aharoni et al., entitled "Method and System for Simulating Performance on One or More Storage Systems," and U.S. patent application Ser. No. 13/065,806 to Smirnov et al., filed Mar. 30, 2011, entitled "Write Pacing Simulation Tool," which are all assigned to EMC Corporation and which are all incorporated herein by reference.

Figure 6:
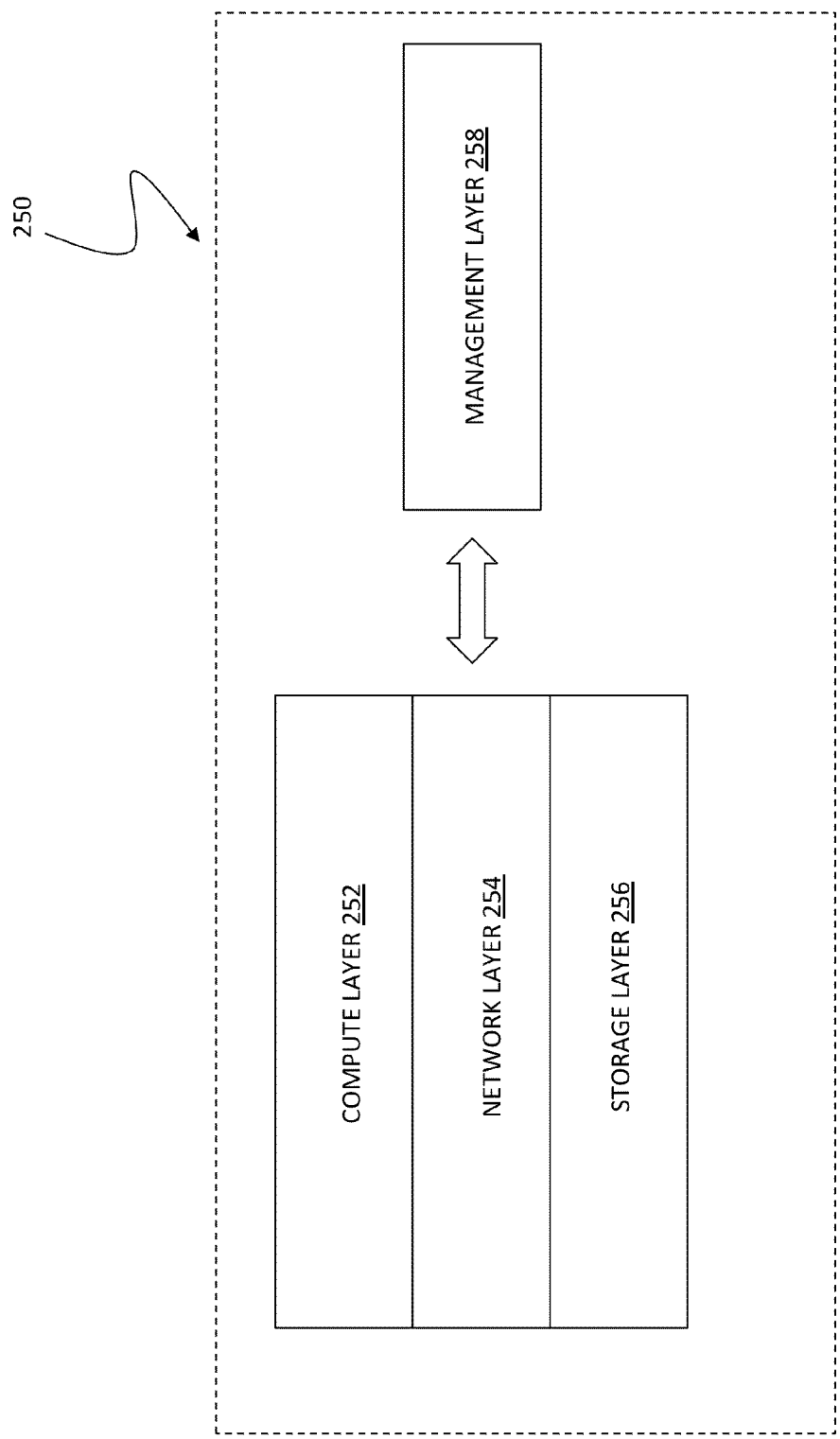
FIG. 6 shows an exemplary cloud computing system that may be used in connection with various embodiments of the system described herein in a manner similar to that discussed herein in connection with other types of distributed processing systems.

FIG. 6 shows an exemplary cloud computing system 250 that may be used in connection with various embodiments of the system described herein in a manner similar to that discussed herein in connection with other types of distributed processing systems. The system 250 may include a compute layer 252, a network layer 254, a storage layer 256 and/or a management layer 258. The system 250 may be understood as providing a cloud computing environment or platform that may be used in connection with cloud storage and/or other appropriate cloud processing applications. The layers 252, 254, 256 and 258 may be coupled together via one or more appropriate networks. In various embodiments, the compute layer 252 may include components, such as blade servers, chassis and fabric interconnects that provide the computing power for the cloud computing system. The storage layer 256 may include the storage components for the cloud computing system, such as one or more storage products produced by EMC Corporation. The network layer 254 may include one or more components that provide switching and routing between the compute and storage layers 252, 256 within systems and/or between multiple cloud computing systems and to the client or customer network. The management layer 258 may provide one or more components used to manage one or more of the layers 252, 254 and/or 256. In an embodiment, the management layer 258 may include EMC Corporation's Unified Infrastructure Manager (UIM), as further discussed elsewhere herein.

Figure 7:
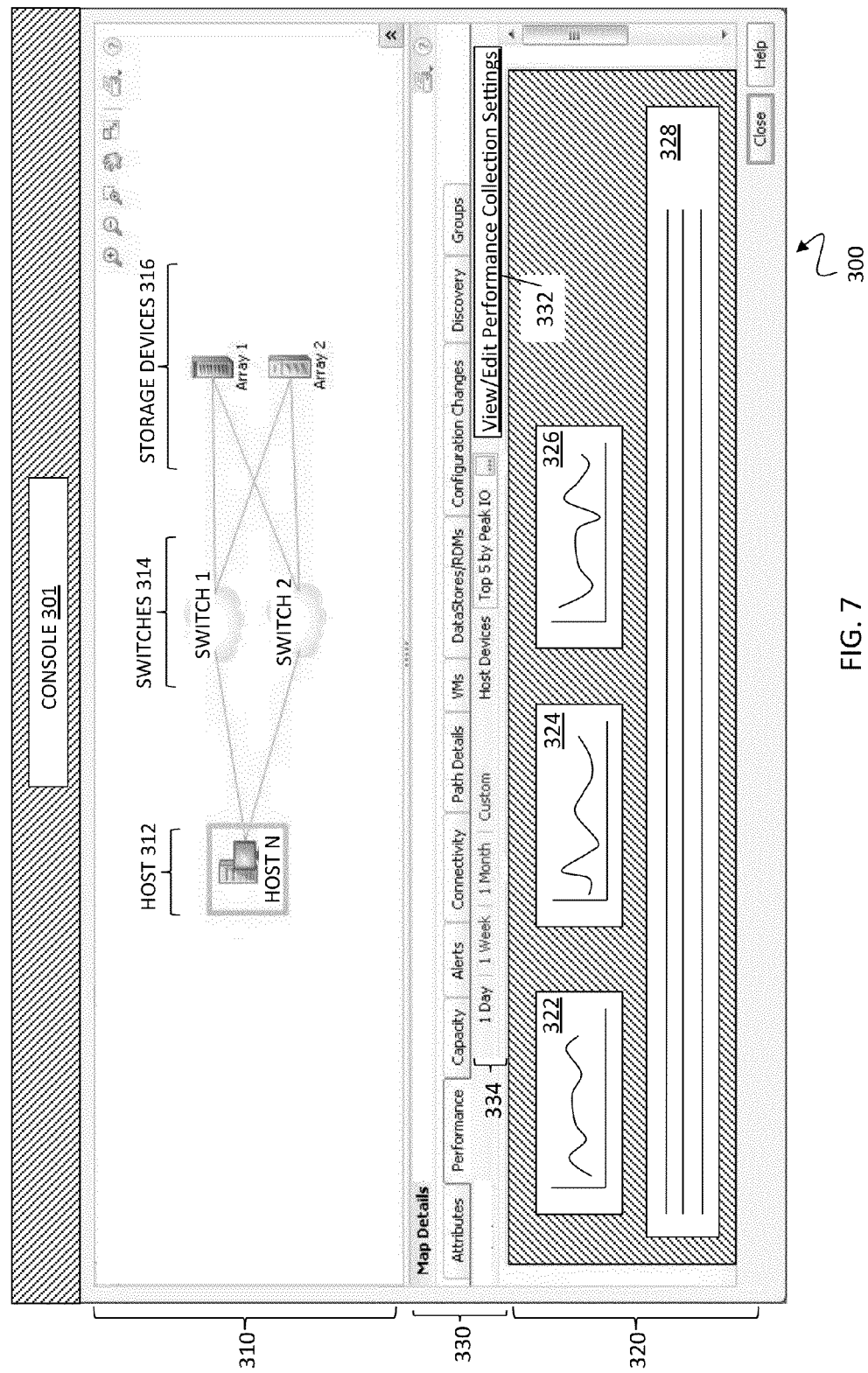
FIG. 7 is a schematic illustration showing a controller according to an embodiment of the system described herein that may include an interface component or console that enables feature control and display.

FIG. 7 is a schematic illustration showing a controller 300 according to an embodiment of the system described herein that may include a console 301 that enables feature control and display. The controller 300 may provide for user interface control and/or display of aspects of the network and components thereof, including performance characteristics and alert relationship analyses, according to various embodiments of the system described herein. As discussed in detail elsewhere herein, the controller 300 may enable determinations of alert relationships, including "on-the-fly" determinations, for alerts affecting multiple causes, symptoms and impacts, and including on-the-fly determinations of root causes. In various embodiments, the alerts may include those for computing, network and/or storage components. The on-the-fly determinations of the controller 300 provide that the alert relationships may be determined in response to a query or request by the user without requiring the maintaining of a large stored hierarchical relationship structure of alerts.

In the illustrated example, the console 301 of the controller 300 is shown displaying a SAN and/or other appropriate network topology corresponding to one or more I/O data paths for a HOST N of the network. The console 301 may include a RESTful (representational state transfer) interface accessible via the Internet. The console 301 may include a graphical section 310 that shows a visual topology representation of the network and components thereof. For example, the section 310 graphical displays the host 312 (HOST N), coupled via switches 314, to one or more storage devices/arrays 316. Section 320 may display map details of the network elements, for example, performance measures for particular elements of I/O data paths in graph form 322, 324, 326 as well as in text or tabulated form 328. The performance measures displayed may include those discussed elsewhere herein, including workload and performance characteristics such as CPU utilization, memory utilization for the host and IOps (I/O in Mb per sec), response time in ms, throughput in KBps, and queue length for host devices, switches, arrays etc., among other appropriate measures.

Section 330 indicates that multiple types of detail and performance measures may be displayed in various forms for the application host, including features corresponding to the I/O data path attributes, performance, capacity, alerts, connectivity, path details, virtual machine (VM) information, data stores, configuration changes, discovery details and group details. A link button 332 may be provided to view/edit performance collection settings. Additionally, according to an embodiment, portion 334 indicates that historical or past performance data collection may be maintained by the system. For example, a user may view past performance data collection from the prior day, prior week, prior month and/or any other customizable date range.

The controller 300 according to the system described herein may provide for analysis and display of alerts for root causes, symptoms and impacts via a single application control. In an embodiment, the controller 300 may be part of a data collection tool that may provide for collection various types of data concerning performance characteristics of the storage devices and/or other elements of the network, including I/O data paths, that may be monitored according to various statistics and measures. Performance characteristics may include, for example, performance data, capacity data, discovery data, including configuration data and/or topology data, among other characteristics. Examples of various performance characteristics may include CPU utilization, memory utilization for the host and IOps (I/O in Mb per sec), response time in ms, throughput in KBps, discovered hosts of an I/O data path, queue length for host devices, whether the hosts are virtual (e.g., running as guest operating system or a virtual machine (VM)) or not, the hosts' IP addresses, operating systems and versions thereof, whether the host is in a group or cluster, and/or other appropriate performance characteristics.

In various embodiments, the component 300 may be an application installed on an application host or other computer providing network administration and/or management functionality and/or may be installed on one or more of hosts coupled to the network. In an embodiment, the component 300 may be used in connection with EMC Ionix products, including the EMC Ionix Unified Infrastructure Manager (UIM), specifically a UIM/Operations (UIM/O) component, and/or EMC Ionix Storage Insight for Availability, produced by EMC Corporation of Hopkinton, Mass. Other storage management products that may be used in connection with the system described herein may include, for example, EMC's ProSphere product and/or a Vblock platform product produced by VCE Company, LLC.

In an embodiment, the statistics used by the component 300 according to the system described herein may be gathered by the component according to the data collection techniques discussed elsewhere herein. Reference is made, for example, to U.S. patent application Ser. No. 13/335,316 to Lim et al., filed Dec. 22, 2011, and entitled "Path Performance Data Collection," which is assigned to EMC Corporation and is incorporated herein by reference, that discloses controlled tuning performance data collection provided through a single application controller of a path performance data collection tool and may be used in connection with the system described herein. The performance data collection may be turned on or off from the application host running the tool via a user interface. Lim's tool may automatically (e.g., without user intervention) update performance data collection characteristics as the application host I/O data path changes according to user controlled settings but without requiring further user intervention during the updating. Turning on path performance data collection on the application host via the user interface may automatically set up synchronized performance data collection for all managed objects within an I/O data path.

In various embodiments, data used in connection with the system described herein may obtained using other data collection devices and mechanisms, including products produced by EMC Corporation such as the EMC Workload Analyzer (WLA), the Symmetrix Performance Analyzer (SPA)®, the Symmetrix CLI statistics collection daemon (STP), the Storage Configuration Advisor (SCA) and/or the ProSphere Discovery Engine, among other possible collection devices, applications and/or appliances. Reference is made, for example, to U.S. Pat. No. 6,622,221 to Zahavi, entitled "Workload Analyzer and Optimizer Integration," which is assigned to EMC Corporation and is incorporated herein by reference and which discloses techniques used in connection with evaluating the performance of proposed device swap plans in accordance with past performance data collected.

Figure 8:
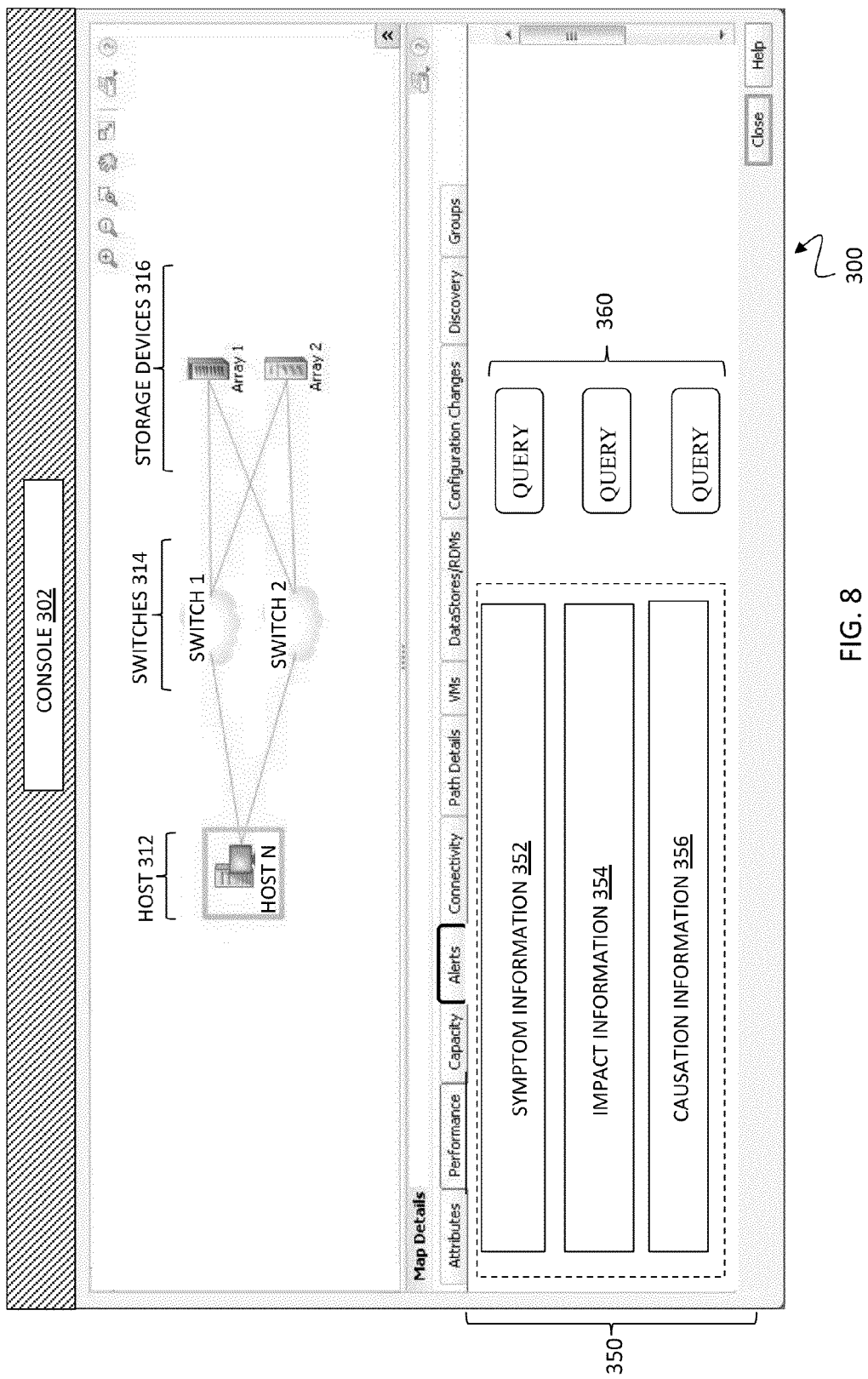
FIG. 8 is a schematic illustration showing another console screen of the controller in which alert relationships for a SAN are illustrated according to an embodiment of the system described herein

FIG. 8 is a schematic illustration showing another console screen (console 302) of the controller 300, having a similar topology display as that of the console 301 but in which alert relationships for the network are illustrated in section 350 of the console 302 according to an embodiment of the system described herein. The section 350 shows alert relationship information determined on-the-fly according to the system described herein and including symptom information 352, impact information 354 and causation information 356, including root causes, in connection with one or more alerts. For a given alert, according to the system described herein, only immediate relationships may be maintained as alert attributes information. For example, for the case where an alert "A" is a root cause, alerts "B" and "C" are intermediate symptoms and alerts "I1" and "I2" are impacts, a user who receives alert C will have the following information:

a) C is caused by alert B; and
b) C impacts I1.

According to the system described herein, if the user wants to obtain further information concerning the alert C, the user may request further information, for example, using one or more query buttons 360 and/or other appropriate query mechanism submitted via the controller 300. In an embodiment, the user may query the controller 300 to determine the "RootCausedBy" information for the alert C and determine, by traversal of an alert relationship path as further discussed elsewhere herein, that alert A is the root cause of alert C and obtain alert A's properties. It is noted that there is a possibility that alert C is caused by multiple alerts, in which case the controller 300 may traverse all possible alert relationship paths, as further discussed elsewhere herein, and determine all root cause alerts of C. A similar algorithm may be applied in a different direction, for example, to determine impact alerts caused by alert C.

TABLE 1, below, shows alert relationship information that may be obtained by the controller 300 based on processing according to the system described herein for a use case example in which: A causes B. B causes C. C impacts I1 and A impacts I2.

TABLE 1

Alert Relationship Information

| | |
|---|---|
| A | Causes B, I2 |
| A | CausedBy <Empty> |
| A | RootCaused by <Empty> |
| A | Impacts I1, I2 |
| B | Causes C |
| B | CausedBy A |
| B | RootCausedBy A |
| B | Impacts I1 |
| C | Causes I1 |
| C | CausedBy B |
| C | RootCausedBy A |
| C | Impacts I1 |
| I1 | Causes <Empty> |
| I1 | CausedBy C |
| I1 | RootCausedBy A |
| I1 | Impacts <Empty> |
| I2 | Causes <Empty> |
| I2 | CausedBy A |
| I2 | RootCausedBy A |
| I2 | Impacts <Empty> |

Figure 9:
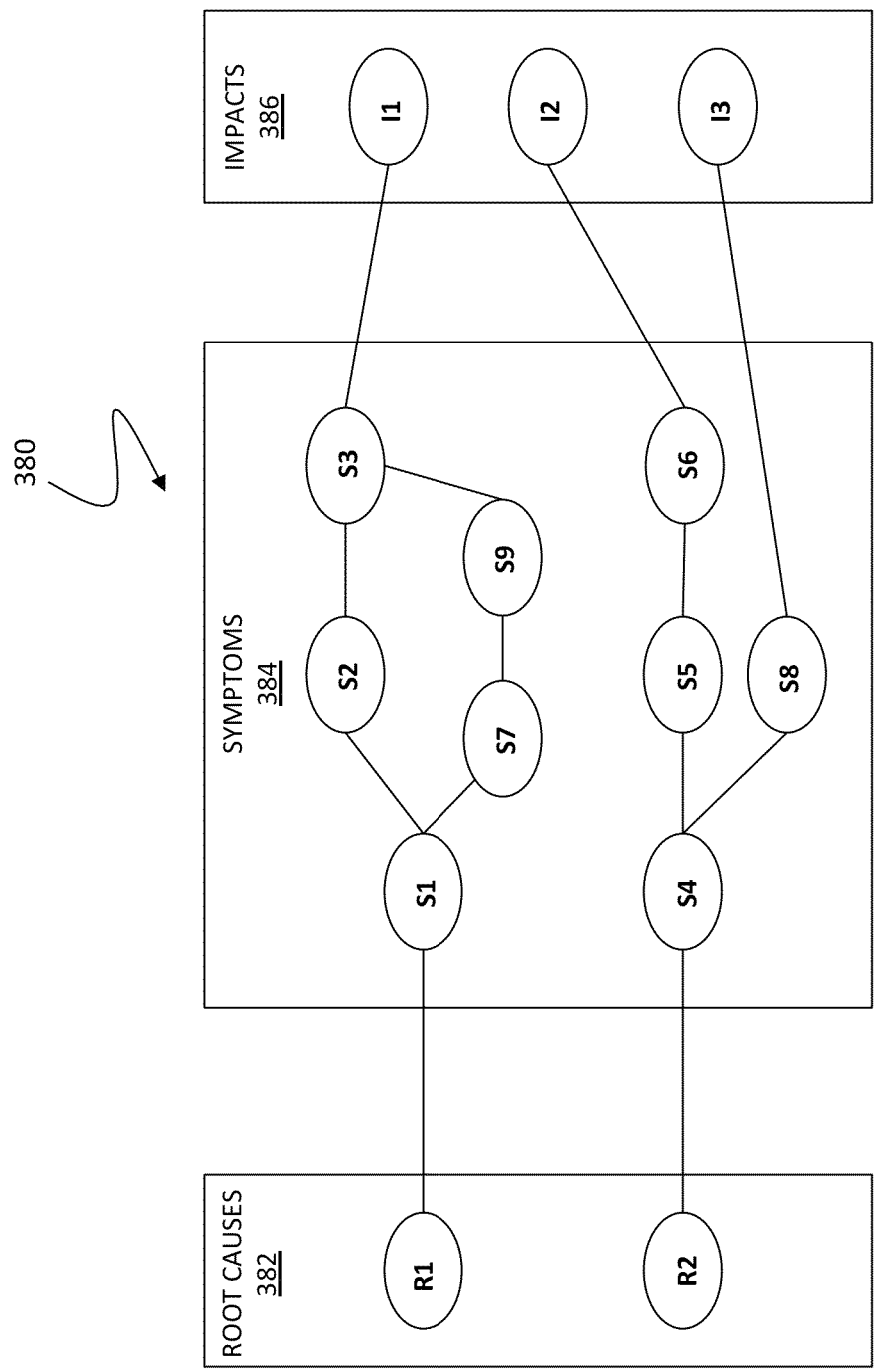
FIG. 9 is a schematic illustration showing an example alert relationship tree with paths that may be traversed according to processing by the controller to determine alert relationships on-the-fly between root causes, symptoms and impacts according to an embodiment of the system described herein.

FIG. 9 is a schematic illustration showing an example alert relationship tree 380 with paths that may be traversed according to processing by the controller 300 to determine alert relationships on-the-fly between root causes 382, symptoms 384 and impacts 386 according to an embodiment of the system described herein. For example, a user may receive and view alert S3 of the tree 380 and desire to know the Root Cause alert of the alert S3. From S3, from the immediate relationships thereof that are maintained, the controller 300 determines that S3 is caused by alerts S9 and S2. Processing of the controller 300 may then include pushing S2 onto a stack and/or other appropriate software structure and traversing the tree beginning from node S9: specifically, S9, S7, S1 and R1.

In the tree traversal, the controller 300 may determine from each alert reached the immediate relationships of that alert in order to continue traversing a particular path of the tree 380. The traversing of paths in the tree 380 may be automatic and provide for automated root cause and impact analyses in accordance with the features of the system discussed herein.

In the above-noted example, the controller 300 determines that R1 is a root cause alert of alert S3 and may store this information in a list, e.g., a RootCauseList. The controller may then pop alert S2 from the stack, and traverse a path through tree 380 beginning with node S2. In this example, the controller 300 will traverse S2 back through S1 to R1 to determine that R1 is the root cause via the S2 path. The controller 300 may determine from the RootCauseList that R1 has already been determined as a root cause for the alert S3. If the controller 300 determines that there are no further alerts from the stack to be traversed, the controller may then return to the requesting user the RootCauseList alerts for S3; specifically, return that R1 is the root cause alert for alert S3. It is noted that a similar algorithm as that noted above may be applied in reverse to determine impact alerts caused by a particular alert. For example, for a received alert S4, for which the user desires to know impact alerts caused thereby, the controller 300 may traverse the tree 380 in a manner similar to that noted discussed above but in a different direction (e.g., paths beginning with alerts S5 and S8, respectively) to determine that impact alerts I2 and I3 (e.g., which may be stored in an ImpactCausedList) are caused by the alert S4.

Figure 10:
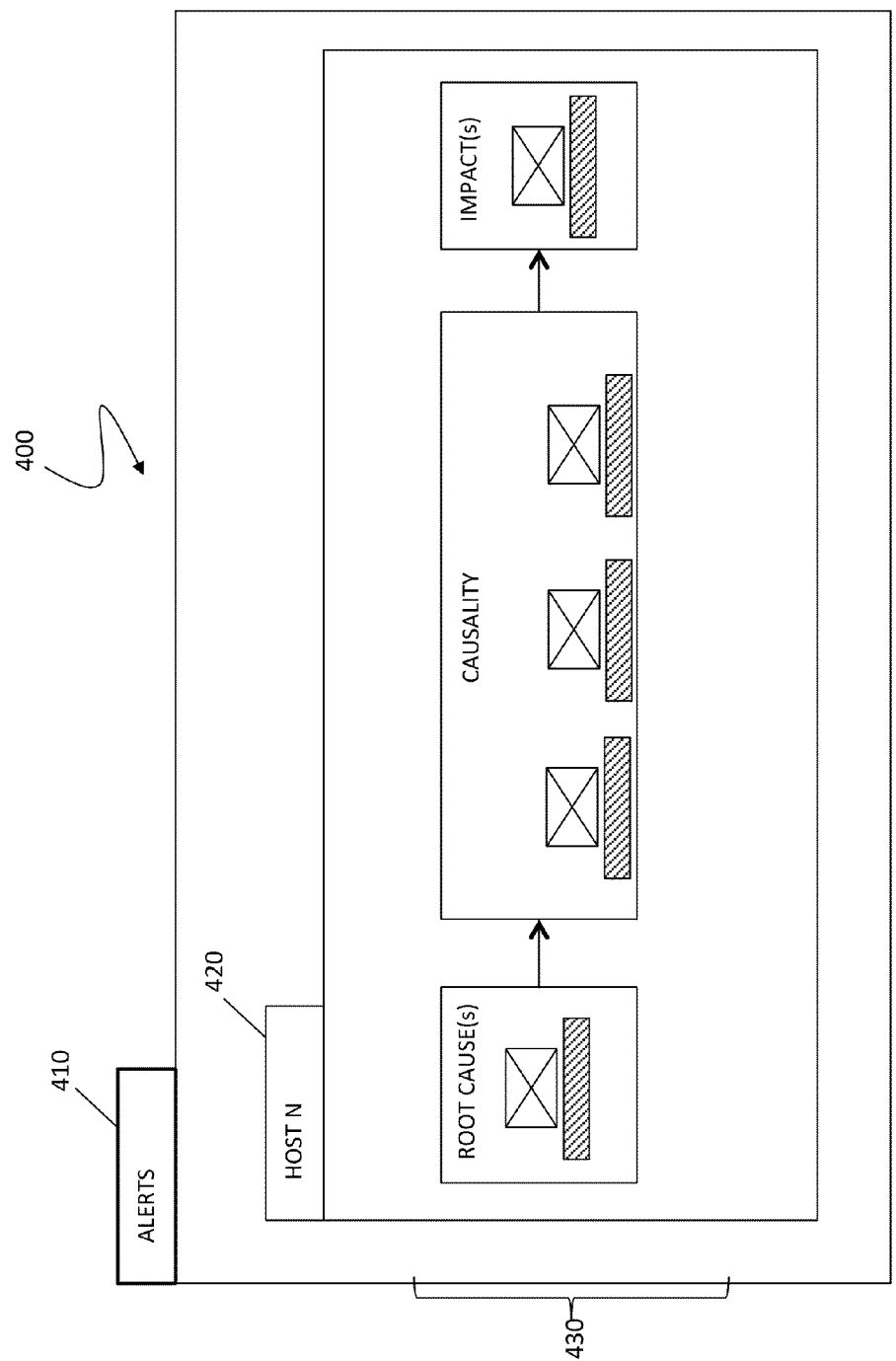
FIG. 10 is a schematic illustration showing a causality map that may be displayed for the user in response to a query submitted to the controller according to an embodiment of the system described herein.

FIG. 10 is a schematic illustration showing a causality map 400 that may be displayed for the user in response to a query submitted to the controller 300 according to an embodiment of the system described herein. The causality map 400 may be a display screen of the controller 400 showing determinations of alerts 410 as queried by a user. The alerts 410 may be shown in a topology view in connection with SAN alert information corresponding to one of more hosts (e.g., HOST N 420). A map overview section 430 of the causality map 400 may provide a visual topology of root cause(s), symptom causality and impact(s) for the one or more hosts, as determined according to processing like that discussed elsewhere herein.

Figure 11:
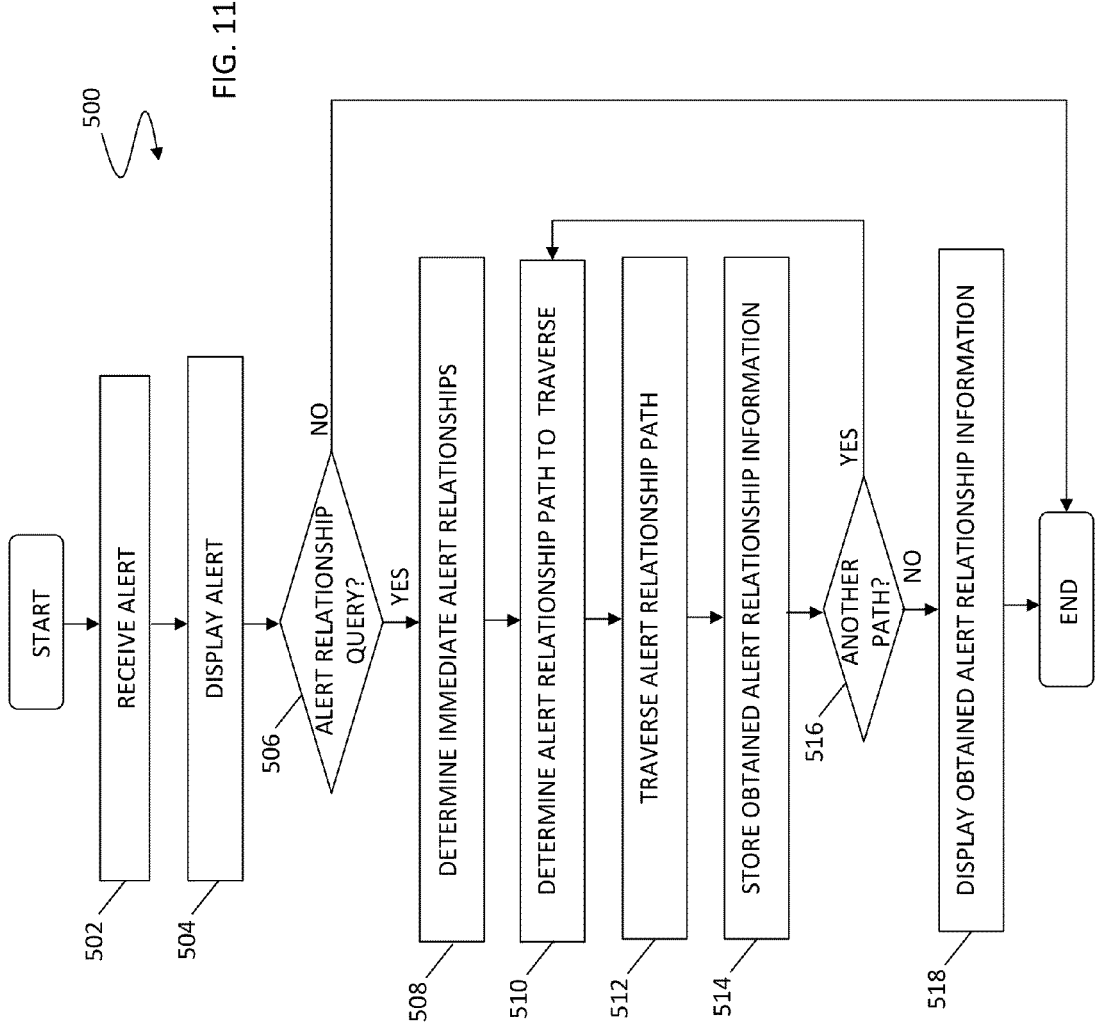
FIG. 11 is a flow diagram showing processing for on-the-fly alert relationship determinations according to an embodiment of the system described herein.

FIG. 11 is a flow diagram 500 showing processing for on-the-fly alert relationship determinations according to an embodiment of the system described herein. At a step 502, an alert is received that may, for example, alert a user to the occurrence of a particular error symptom occurring on the SAN. After the step 502, processing proceeds to a step 504 where the alert is displayed on an interface of a controller. After the step 504, processing proceeds to a test step 506 where it is determined whether a user has requested alert relationship information corresponding to the received alert, for example, the user by activating a query using the interface. In various embodiments, the alert relationship information queries may include requests for one or more root causes of the alert and/or impacts of the alert. If, at the test step 506, it is determined that the user has made no query request for further alert relationship information, then processing is complete. If, at the test step 506, it is determined that the user has requested alert relationship information then processing proceeds to a step 508 where immediate relationships of the alert are determined. For example, the immediate relationships may include the directly preceding cause of the alert and/or the directly subsequent cause/impact of the alert.

After the step 508, processing proceeds to a step 510 where an alert relationship path is determined for traversal. For example, to determine a root cause of a received alert, the beginning of the traversal path will be an immediately preceding cause of the received alert. In the case where there are more than one preceding causes, all but one of the causes will be temporarily suspended (e.g., pushed onto a stack and/or other software structure for later retrieval) and the remaining cause will indicate the beginning of the path for traversal. A similar but reverse process may be used for obtaining a desired impact of a received alert. After the step 510, processing proceeds to a step 512 where the selected alert relationship path is traversed. After the step 512, processing proceeds to a step 514 where desired alert relationship information (e.g., root cause or impact) is obtained and stored.

After the step 514, processing proceeds to a test step 516 where it is determined if another path exists for received alert. For example, if the received alert was caused by two different alerts, and a first one of the causality alerts was initially used to establish the path for traversal, then the second of the causality alerts may be used to establish another path. Accordingly, if, at the test step 516, it is determined that another path exists then processing proceeds back to the step 510 to determine the (next) alert relationship path for traversal. For example, the next causality alert may be popped from the software stack where it has been temporarily stored. If, at the test step 516, it is determined that another path does not exist for the received alert, then processing proceeds to a step 518 where the obtained and stored alert relationship information is displayed using a console of a controller, for example, responsive to a user's query. After the step 518, processing is complete.

Under various circumstances, it is desirable to send alerts collected for cloud computing system to external systems. For example, alerts may be sent using a syslog protocol. A syslog message, however, may be limited in size (e.g., 1024 bytes, see, e.g., RFC 5424, "The Syslog Protocol," which is incorporated herein by reference). Known approaches to deal with an alert message that exceeds the permitted syslog message size is to truncate the alert message and transmit as a truncated syslog message and/or to cut the alert message into multiple parts physically based only on the length of the message and send as multiple syslog messages. In a further technique provided by EMC's Unified Infrastructure Manager/Operations (UIM/O) product, efficient partitioning and/or fragmenting of a syslog message may be provided based on the use of various types of message identifications and/or certain other information in which, by virtue of the partitioning and fragmenting, an alert message, regardless of its length, may be sent using the syslog protocol. Specifically, using the message identifications and/or the other information, the alert syslog message, partitioned by the UIM/O product, may be reconstructed at the external system based on the multiple partitioned/fragmented syslog messages. The message IDs and/or other information of the partitioned/fragmented messages may be further used in connection with checking data integrity of the received messages.

In an embodiment, an algorithm for partitioning/fragmenting syslog messages may be as follows. If an alert message exceeds a specified size (e.g., 1024 bytes), the system described herein may divide (partition) the alert into two or more smaller messages (partitions). The alert message may be partitioned so that each part is independent. Each partitioned message may include the following: Header; Alert ID, and Alert Data. The Header and Alert ID may be the same each partition. Where the Alert Data is too large for any one alert message partition, any such alert message partition may then be fragmented, such that each fragment contains a portion of the Alert Data.

The following information may be added to each fragmented message after the header: message ID (a unique number for the alert message); fragmentation count (specifying the number of fragments into which the alert message has been split); and fragmentation ID (identifying the fragment in the sequence). The message ID and fragmentation count may be the same for all fragments of the alert message or message partition. The message ID may be auto generated based on the alert message or message partition. A client of a syslog service may construct the original alert (e.g., Vblock alert) message from the partition/fragmented messages. It is further noted that the Message ID may be cyclic redundancy check (CRC) information that may be used to check data integrity.

In some cases, it is advantageous to transmit alert messages using mechanisms other than the syslog protocol, like that used by prior versions of EMC's UIM/O product. According to the system described herein, cloud computing system (e.g., Vblock) alert messages may be advantageously and efficiently sent to external and/or remote systems using mechanisms in addition to and/or other than the syslog protocol. In an embodiment, as further discussed in detail elsewhere herein, alert messages may be sent using a simple network management protocol (SNMP) trap notification (see, e.g., RFC 1215, "A Convention for Defining Traps for use with the SNMP," which is incorporated herein by reference). It is noted that the system described herein may further be used with any other appropriate protocol, including, for example, http, https and/or an e-mail protocol. Further, the system described herein also provides for additional alert attributes to be used in connection with sending cloud computing system alert messages to external systems using the syslog protocol and/or other mechanisms. In an embodiment, the system described herein may be used in connection with sending Vblock alert messages to external systems; however, in other embodiments, the system described herein may be used in connection with appropriate storage devices/platforms other than specifically Vblock.

Figure 12:
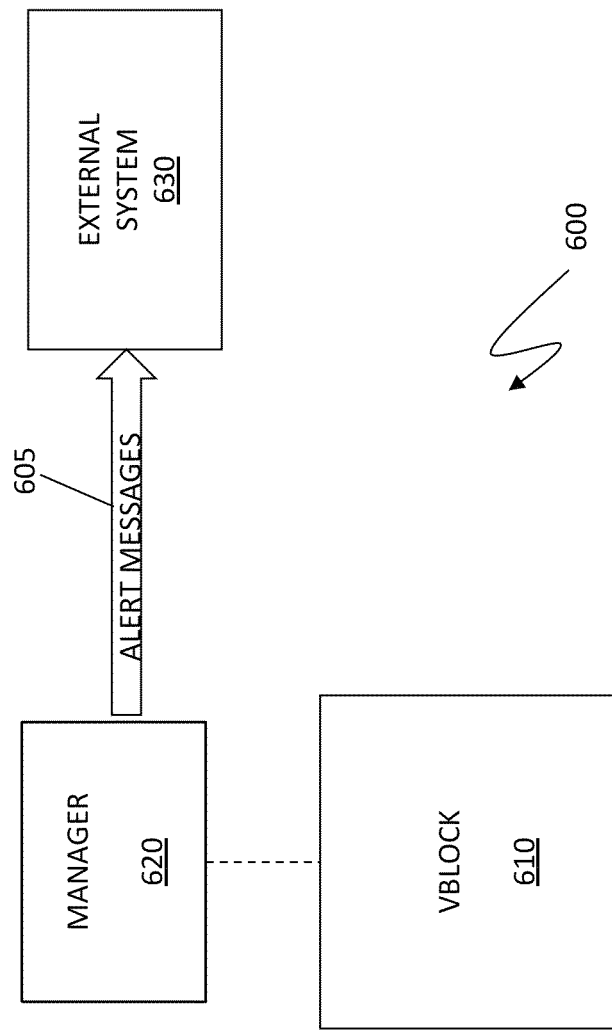
FIG. 12 is a schematic illustration showing a system for sending processed alert messages from a cloud computing system (Vblock) to an external system according to an embodiment of the system described herein.

FIG. 12 is a schematic illustration showing a system 600 for sending processed alert messages 605 from a cloud computing system (Vblock) 610 to an external system 630 according to an embodiment of the system described herein. The system 600 includes a manager component 620 that is coupled to the cloud computing system 610 that may control the operations of the alert gathering and alert message formulation. In various embodiments, other components (not shown) may be coupled to, and/or incorporated within, the manager component 620 to provide for the determination and gathering of alert information concerning one or more of network, compute and storage resources utilized by the cloud computing system 610. As discussed in detail elsewhere herein, the processed alert messages 605 may include particular alert data and attribute information that has been formulated in accordance with one or more protocols, including syslog protocol and/or SNMP trap, and that has been partitioned and/or fragmented into multiple alert messages (partitions and/or fragments) that satisfy transmission restrictions of the transmission protocol.

According to an embodiment of the system described herein, an appropriate version of SNMP (such as v1, v2c and/or v3), along with an associated Management Information Base (MIB), may be used to provide for trap notification in connection with the sending of alert messages to an external system. In trap-based notification, each agent on a managed device may notify a device manager, without solicitation, in connection with an event involving the managed device. This is done by sending an alert message known as a "trap" of the event. After the manager receives the message, the manager may display the message and choose to take an action based on the event. Trap-based notification eliminates the need for unnecessary SNMP polling requests.

Figure 13:
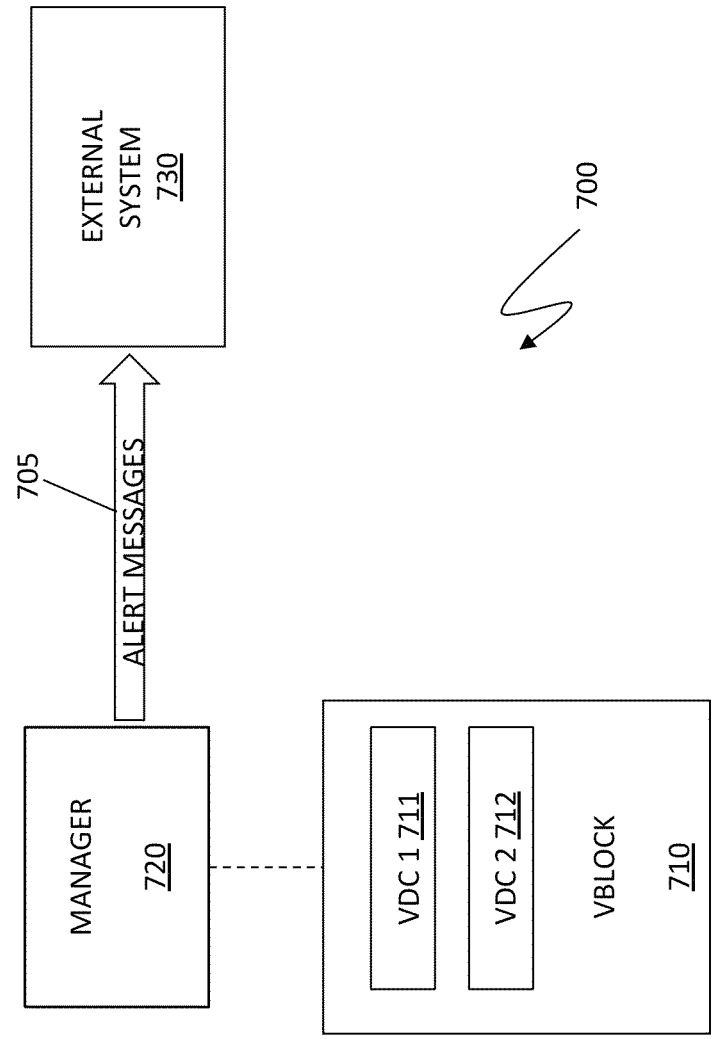
FIG. 13 is a schematic illustration showing a system for sending alert messages from a cloud computing system including multiple VDCs to an external system according to an embodiment of the system described herein.

FIG. 13 is a schematic illustration showing a system 700 for sending alert messages 705 from a cloud computing system (Vblock) 710 to an external system 730 according to an embodiment of the system described herein. The Vblock 710 may include one or more VDCs (VDC 1 711, VDC 2, 712), as further discussed elsewhere herein, and the alerts may correspond to the VDCs 711, 712. The system 700 includes a manager component 720 that is coupled to the cloud computing system 710 that may control the operations of the alert gathering and alert message formulation. In various embodiments, other components (not shown) may be coupled to, and/or incorporated within, the manager component 720 to provide for the determination and gathering of alert information concerning one or more of network, compute and storage resources utilized by the cloud computing system 710. As discussed in detail elsewhere herein, the processed alert messages 705 may include particular alert data and attribute information that has be formulated in accordance with one or more protocols, including syslog protocol and/or SNMP trap, and that has been partitioned and/or fragmented into multiple alert messages (partitions and/or fragments) that satisfy transmission restrictions of the transmission protocol.

Figure 14:
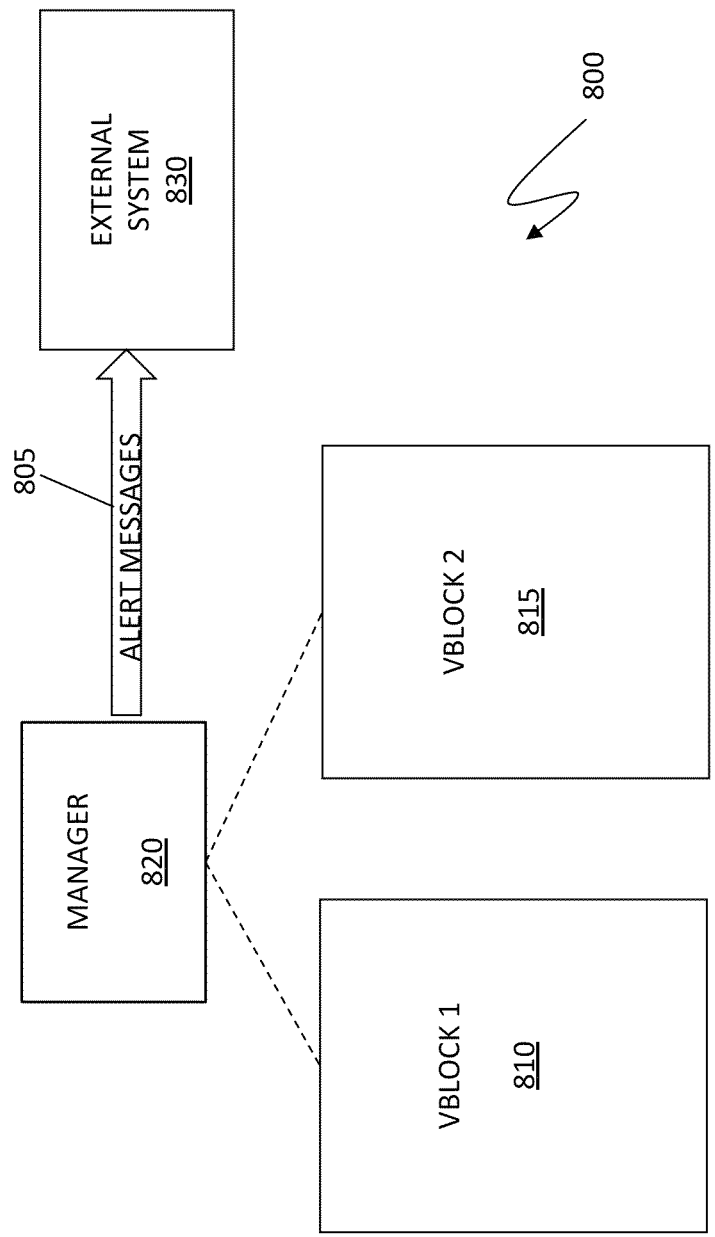
FIG. 14 is a schematic illustration showing a system for sending processed alert messages from multiple cloud computing systems, Vblock 1 and Vblock 2, to an external system according to an embodiment of the system described herein.

FIG. 14 is a schematic illustration showing a system 800 for sending processed alert messages 805 from multiple cloud computing systems, Vblock 1 810 and Vblock 2 815, to an external system 830 according to an embodiment of the system described herein. The Vblocks 810, 815 may both be configured and include components as further discussed elsewhere herein and the alerts may correspond to the both of the Vblocks 810, 815. Although two Vblocks are illustrated, the system described herein may operate in connection with more than two Vblocks. The system 800 includes a manager component 820 that is coupled to the cloud computing systems 810, 815 that may control the operations of the alert gathering and alert message formulation. In various embodiments, other components (not shown) may be coupled to, and/or incorporated within, the manager component 820 to provide for the determination and gathering of alert information concerning one or more of network, compute and storage resources utilized by the cloud computing systems 810, 815. As discussed in detail elsewhere herein, the processed alert messages 805 may include particular alert data and attribute information that has be formulated in accordance with one or more protocols, including syslog protocol and/or SNMP trap, and that has been partitioned and/or fragmented into multiple alert messages (partitions and/or fragments) that satisfy transmission restrictions of the transmission protocol.

According to an embodiment of the system described herein, if the alert message is too large, and/or requires partitioning and/or fragmenting for another reasons, the alert message may be partitioned and/or fragmented. First, the alert message may be partitioned in multiple messages, and an Alert ID and attribute information may be sent in the first message, and fragmentation information may be added to each fragment of alert data contained in the message partitions. In an embodiment, the following information may be added to each fragment of alert data after the header: message ID (a unique number for the alert message); fragmentation count (specifying the number of fragments into which the alert message has been split); fragmentation ID (identifying the fragment in the sequence). The message ID and fragmentation count may be the same for all fragments of an alert message. For example, an alert message may be partitioned into three smaller messages. The second message may contain a long attribute value pair that requires fragmentation.

UIM/O may then split the second message into two fragments. Each fragment may include the message ID, fragmentation count, and fragmentation ID. In various embodiments, the syntax of the alert message may correspond to syslog messages and/or SNMP trap messages.

In an embodiment, an alert message may have a syntax like that shown in TABLE 2:

TABLE 2

Alert message syntax

| Message part | Description |
|---|---|
| Header | A timestamp and the host name or IP address of the message originator. Where a message is partitioned, the Header may be repeated in each of the partitioned messages. |
| Fragmentation properties, if any | For each partitioned message, when the message would be longer than a specified size because Alert data is too long, the Alert data may be fragmented into two or more parts. For the fragmented messages, the fragmentation properties below may uniquely identify each fragmented portion: |
| | Message ID Total fragmentation count (number of fragments) Fragmentation ID |
| Alert ID | Identifying information of the alert. |
| Alert data | For fragmented message, the alert data may be fragmented in multiple parts. The alert data may include attribute information for active and inactive alerts. Attributes associated with an active alert may include: |
| | AffectedComponent ComponentType Message URI Severity State LastUpdatedTime AffectedObject ObjectType SourceID SourceType ServiceName FullMessage BladeGrade LunGrade VblockName ServiceMap VblockMap RcaType ImpactType ImpactIndex SeverityIndex AffectedObjectName PrevSeverity VdcName OrganizationName Attributes associated with inactive and archived alerts may include: |
| | AffectedComponent ComponentType Message URI Severity State LastUpdatedTime |

The following is a more detailed description of the alert attributes identified in TABLE 2 that may be used in an alert message according to the system described herein:

AffectedComponent is the name or IP address of the component affected by the alert.

ComponentType specifies the category of the component type affected by the alert and categories may include components such as Interface, Memory, Storage, VM, ESX, and Datacenter.

Message is a brief description that corresponds to the event name.

Severity specifies one of the following severity types, e.g., Critical, Error, Warning, or Information.

State indicates whether the alert is ACTIVE, INACTIVE, or ARCHIVED.

LastUpdatedTime specifies the last time the alert was modified.

AffectedObject is the name or IP address of the object affected by the alert. For example, for the failed LAN port-channel on a Fabric Interconnect alert, the value of Affected Object might be the IP address for an affected manager.

ObjectType is the type of object affected by the alert. Values include: unified computing system manager (UCSM); Blade; and/or Switch.

SourceID is the name or IP address of the alert source.

SourceType is the source of the alert. Valid values may include: UIM, vCenter, UCSM, and/or EMC Common Object Manager (ECOM).

ServiceName is the name of the UIM service(s) affected by the alert.

FullMessage is the complete alert message description.

BladeGrade is the grade of the Blade affected by this alert.

LunGrade is the grade of the LUN affected by this alert.

VblockName is the name of the Vblock(s) affected by this alert.

URI is the uniform resource identifier (URI) for the alert.

RcaType is the root cause type for the alert.

ImpactType the impact type for the alert.

ImpactIndex is the impact index for the alert.

SeverityIndex the severity index for the alert.

AffectedObjectName is the name of the affected object.

VdcName is the alert VDC name.

OrganizationName is the alert organization name.

According to the system described herein, to send alert messages to an external system, one or more alert messages received and processed by a management component, such as EMC's UIM/O, of a cloud computing system may be sent to the external system according to an alert forward configuration. In various embodiments, the alerts may be sent as SNMP trap messages and/or syslog messages to the external systems. The external systems may be specified in a forwarding screen of an interface of the management component. Alert messages may be sent to external systems as controlled by a user and/or may be configured to be sent automatically at periodic intervals (e.g., every 60 seconds). In other embodiments, the alert messages may be sent in real time immediately after the alerts are processed.

Parameters of the alert forwarding configuration may be set in connection with controlling when and under what conditions alert messages are sent to an external system. Multiple configurations using same or different protocols can be set for single or multiple external systems. For example, different alert forwarding configuration may be established having parameters such as the name of the alert forwarding configuration, the hostname or IP address of the system receiving alerts, and the UDP port number on the target host where the SNMP traps or syslog messages are to be forwarded. In various embodiments, the port number may be between 0 and 65535 inclusive. The configurations may be modified according to whether the alert message is to be sent as an SNMP trap message or a syslog message. Different ports may be used according to an SNMP trap message or syslog message. For example, for an SNMP trap message, if unspecified, a default SNMP port a particular number (e.g., port number 162) may be used, whereas, for a syslog message, another default value port number (e.g., port number 514) may be used.

The severity level configurations for forwarded alerts may also determine when and under what conditions alerts are forwarded. For example, if a severity configuration level is set to a particular level, then all the alerts that are at or above that severity level may be forwarded. That is, if the severity configuration level is set to WARNING then all alerts that are at a severity of WARNING, ERROR or CRITICAL may be sent to the external system. Further, in various embodiments, existing alerts may be forwarded in addition to new alerts that may occur, while in other embodiments, only new alerts may be sent. In an embodiment, there may be four severity levels for alerts: 1 (critical); 2 (major/error); 3 (minor/warning); and 4 (information), such as used in the UIM/O system. Depending, however, on the protocol type for the sending of the alert message, mapping may be required between the alert message security level (e.g., at the UIM/O system) and the message protocol alert levels.

In an embodiment, severity mapping may be used for syslog messages since there are eight levels of severity defined in syslog protocol but, as noted, may be only four in UIM/O. The mapping between the UIM/O alert severity levels and the syslog message severity levels is described in the following TABLE 3:

TABLE 3

Security Mapping for Syslog Messages

| Alert Number | Alert Severity | Syslog Code | Syslog Severity | Description |
|---|---|---|---|---|
|  |  | 0 | Emergency | System is unusable |
|  |  | 1 | Alert | Action must be taken immediately |
| 1 | CRITICAL | 2 | Critical | Critical conditions |
| 2 | ERROR | 3 | Error | Error conditions |
| 3 | WARNING | 4 | Warning | Warning conditions |
|  |  | 5 | Notice | Normal but significant condition |
| 4 | INFORMATION | 6 | Information | Information messages |
|  |  | 7 | Debug | Debug-level messages |

In another embodiment, severity mapping may be used for SNMP trap messages and it is noted that the use of severity level designations are similar as between SNMP trap and UIM/O. The mapping between the UIM/O alert severity levels and the SNMP trap message severity levels is described in the following TABLE 4:

TABLE 4

Severity mapping for SNMP traps

| Alert Number | Alert SEVERITY | SNMP Severity | Description |
| --- | --- | --- | --- |
| 1 | CRITICAL | Critical | Critical conditions |
| 2 | ERROR | Error | Error conditions |
| 3 | WARNING | Warning | Warning conditions |
| 4 | INFORMATION | Information | Information messages |

FIG. 15 is a flow diagram 900 showing processing for sending an alert message according to an embodiment of the system described herein. At a step 902, one or more alerts are collected at a manager component from one or more coupled cloud computing systems. The alert(s) may correspond to one or more of compute, network and/or storage resources. After the step 902, processing proceeds to a test step 904 where it is determined whether one or more alert messages concerning the collected alerts are to be sent to an external system. In various embodiments, the sending of an alert message may be controlled manually and/or may be automatically performed at periodic intervals. It is further noted that the frequency and/or initiating of message transmission may also be determined based on the severity level of the alert and the security level configuration parameters of the alert message system. If at the test step 904 it is determined that an alert message is not (or not yet) to be sent, then processing proceeds back to the step 902. Otherwise, if one or more alerts are to be sent then processing proceeds to a step 906 where a type of the alert message is determined. In various embodiments, the alert message may be a syslog protocol message and/or may be an SNMP trap message. It is further noted that the system described herein may be used in connection with any other appropriate protocol, including, for example, http, https and/or an e-mail protocol.

After the step 906, processing proceeds to a step 908 where the alert message of the determined type is prepared according to an appropriate syntax and including particular alert attributes, as further discussed elsewhere herein. After the step 908, processing proceeds to a step 910 where it is determined whether the alert message requires partitioning and/or fragmenting in accordance with the system described herein. If not, then processing proceeds to a step 912 where the alert message is sent to the external system. After step 912, processing is complete.

If, at the test step 910, it is determined that the alert message of the specified type requires partitioning and/or fragmentation in order to be sent to the external system, then processing proceeds to a step 914 where partition and/or fragmentation processing is performed. As further discussed elsewhere herein, an alert message may partitioned into multiple messages, each having a header and alert ID corresponding to an alert, and one or more of the partitioned messages may be fragmented into multiple fragments that each contain a portion of fragmented alert data with alert attribute information along with fragmentation identification information including a message ID, fragmentation count and fragmentation ID. After the step 914, processing proceeds to a step 916 where the partitioned and/or fragmented alert messages are transmitted to the external system which may collect the partitioned/fragmented alert message and reconstruct the original alert message, thereby permitting transmission of an alert message that, without the above-noted processing, would have been too large for normal message transmission according to syslog message size restrictions, for example. It is noted that, according to various embodiments of the system described herein, the alert message may be reconstructed at the external system even in situations where the partitioned or fragmented messages are received out of order. After the step 916, processing is complete.

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable medium and executed by one or more processors. The computer readable medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for sending an alert message from a cloud computing system to an external system, comprising:
    collecting at least one alert for the cloud computing system;
    determining a time for sending the at least one alert as an alert message to the external system;
    determining a transmission type of the alert message;
    preparing the alert message according to the transmission type;
    determining whether the alert message is transmissible in unaltered form according to the determined transmission type;
    after determining that the alert message is not transmissible in unaltered form according to the determined transmission type, performing message form processing on the alert message to yield a plurality of processed form messages, wherein the message form processing includes partitioning the alert message into a plurality of partitioned messages, and fragmenting at least one of the plurality of partitioned messages into a plurality of fragmented messages; and
    sending the plurality of processed form messages to the external system.

2. The method according to claim 1, wherein the transmission type includes at least one of: syslog protocol or simple network management protocol (SNMP) trap.

3. The method according to claim 1, wherein the time for sending the at least one alert is determined according to at least one of: (i) based on content of the alert message, (ii) manually set by a user, (iii) automatically at periodic intervals, or (iv) in real time after the at least one alert is processed.

4. The method according to claim 1, wherein the alert message includes alert data that includes at least one alert attribute.

5. The method according to claim 4, wherein each of the plurality of fragmented messages includes a portion of the alert data.

6. The method according to claim 1, wherein each of the plurality of partitioned messages and each of the plurality of fragmented messages include information that permits reconstructing of the alert message.

7. The method according to claim 1, wherein the cloud computing system includes at least one Vblock and wherein the at least one alert includes a Vblock alert.

8. The method according to claim 1, wherein determining whether the alert message is transmissible in unaltered form according to the determined transmission type includes determining that the alert message is not transmissible in unaltered from based on a size of the alert message exceeding a permitted size according to the determined transmission type.

9. A non-transitory computer readable medium storing software for sending an alert message from a cloud computing system to an external system, the software comprising:
   executable code that collects at least one alert for the cloud computing system;
   executable code that determines a time for sending the at least one alert as an alert message to the external system;
   executable code that determines a transmission type of the alert message;
   executable code that prepares the alert message according to the transmission type;
   executable code that determines whether the alert message is transmissible in unaltered form according to the determined transmission type;
   executable code that, after determining that the alert message is not transmissible in unaltered form according to the determined transmission type, performs message form processing on the alert message to yield a plurality of processed form messages, wherein the message form processing includes partitioning the alert message into a plurality of partitioned messages, and fragmenting at least one of the plurality of partitioned messages into a plurality of fragmented messages; and
   executable code that sends the plurality of processed form messages to the external system.

10. The non-transitory computer readable medium according to claim 9, wherein the transmission type includes at least one of: syslog protocol or simple network management protocol (SNMP) trap.

11. The non-transitory computer readable medium according to claim 9, wherein the time for sending the at least one alert is determined according to at least one of: (i) based on content of the alert message, (ii) manually set by a user, (iii) automatically at periodic intervals, or (iv) in real time after the at least one alert is processed.

12. The non-transitory computer readable medium according to claim 9, wherein the alert message includes alert data that includes at least one alert attribute.

13. The non-transitory computer readable medium according to claim 12, wherein each of the plurality of fragmented messages includes a portion of the alert data.

14. The non-transitory computer readable medium according to claim 9, wherein each of the plurality of partitioned messages and each of the plurality of fragmented messages include information that permits reconstructing of the alert message.

15. The non-transitory computer readable medium according to claim 9, wherein the cloud computing system includes at least one Vblock and wherein the at least one alert includes a Vblock alert.

16. The non-transitory computer readable medium according to claim 9, wherein determining whether the alert message is transmissible in unaltered form according to the determined transmission type includes determining that the alert message is not transmissible in unaltered from based on a size of the alert message exceeding a permitted size according to the determined transmission type.

17. A cloud computing system that sends an alert message to an external system, comprising:
   at least one cloud processing component, wherein the cloud processing component is at least one of: a compute component, a network component or a storage component; and
   a manager component that includes at least one processor and a non-transitory computer readable medium storing software executable by the at least one processor, the software including:
      executable code that collects at least one alert for the cloud computing system;
      executable code that determines a time for sending the at least one alert as an alert message to the external system;
      executable code that determines a transmission type of the alert message;
      executable code that prepares the alert message according to the transmission type;
      executable code that determines whether the alert message is transmissible in unaltered form according to the determined transmission type;
      executable code that, after determining that the alert message is not transmissible in unaltered form according to the determined transmission type, performs message form processing on the alert message to yield a plurality of processed form messages, wherein the message form processing includes partitioning the alert message into a plurality of partitioned messages, and fragmenting at least one of the plurality of partitioned messages into a plurality of fragmented messages; and
      executable code that sends the plurality of processed form messages to the external system.

18. The system according to claim 17, wherein the transmission type includes at least one of: syslog protocol or simple network management protocol (SNMP) trap.

19. The system according to claim 17, wherein the at least one cloud processing component includes a Vblock, and wherein the at least one alert includes a Vblock alert.

20. The system according to claim 17, wherein the alert message includes alert data that includes at least one alert attribute, and wherein each of the plurality of fragmented messages includes a portion of the alert data.

* * * * *